(12) United States Patent
Park et al.

(10) Patent No.: US 9,357,419 B2
(45) Date of Patent: May 31, 2016

(54) METHOD FOR REPORTING CHANNEL STATE INFORMATION IN WIRELESS COMMUNICATION SYSTEM AND APPARATUS FOR SAME

(75) Inventors: Jonghyun Park, Gyeonggi-do (KR); Daewon Lee, Gyeonggi-do (KR); Hanbyul Seo, Gyeonggi-do (KR); Kijun Kim, Gyeonggi-do (KR); Hyungtae Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 351 days.

(21) Appl. No.: 13/993,000

(22) PCT Filed: Dec. 22, 2011

(86) PCT No.: PCT/KR2011/009987
§ 371 (c)(1),
(2), (4) Date: Jun. 10, 2013

(87) PCT Pub. No.: WO2012/087046
PCT Pub. Date: Jun. 28, 2012

(65) Prior Publication Data
US 2013/0258897 A1   Oct. 3, 2013

Related U.S. Application Data

(60) Provisional application No. 61/427,101, filed on Dec. 23, 2010.

(51) Int. Cl.
*H04W 24/10* (2009.01)
*H04B 7/06* (2006.01)
*H04L 5/00* (2006.01)

(52) U.S. Cl.
CPC ............ *H04W 24/10* (2013.01); *H04B 7/0626* (2013.01); *H04B 7/0632* (2013.01); *H04B 7/0639* (2013.01); *H04L 5/0057* (2013.01); *H04L 5/0007* (2013.01)

(58) Field of Classification Search
None
See application file for complete search history.

(56) References Cited

U.S. PATENT DOCUMENTS

2009/0059844 A1*  3/2009  Ko et al. ................. 370/328
2010/0254335 A1   10/2010  Koo et al.
2013/0273931 A1* 10/2013  Lunttila et al. .......... 455/452.2

FOREIGN PATENT DOCUMENTS

WO   WO 2010/123313 A2   10/2010

OTHER PUBLICATIONS

3GPP, "3rd Generation Partnership Project; Technical Specification Group Radio Access Network; Evolved Universal Terrestrial Radio Access (E-UTRA); Physical layer procedures (Release 9)." 3GPP TS 36.213 V9.2.0, Jun. 2010.
3GPP, "3rd Generation Partnership Project; Technical Specification Group Radio Access Network; Evolved Universal Terrestrial Radio Access (E-UTRA); Multiplexing and channel coding (Release 9)." 3GPP TS 36.212 V9.2.0, Jun. 2010.

* cited by examiner

*Primary Examiner* — Noel Beharry
*Assistant Examiner* — Wilfred Thomas
(74) *Attorney, Agent, or Firm* — Dentons US LLP

(57) ABSTRACT

The present invention relates to a wireless communication system. More particularly, the present invention relates to a method and an apparatus for reporting channel state information, the method and the apparatus comprising the following steps: measuring downlink signals from a plurality of base stations; feeding back a first channel state information on a first base station in subband units, wherein the first channel state information includes identification information for indicating a corresponding subband; and feeding back a second channel state information on a second base station in subband units, wherein the subband which corresponds to the second channel state information is set to be identical to the subband which corresponds to the first channel state information, and wherein the second channel state information does not include identification information for indicating the corresponding subband.

8 Claims, 16 Drawing Sheets

FIG. 2
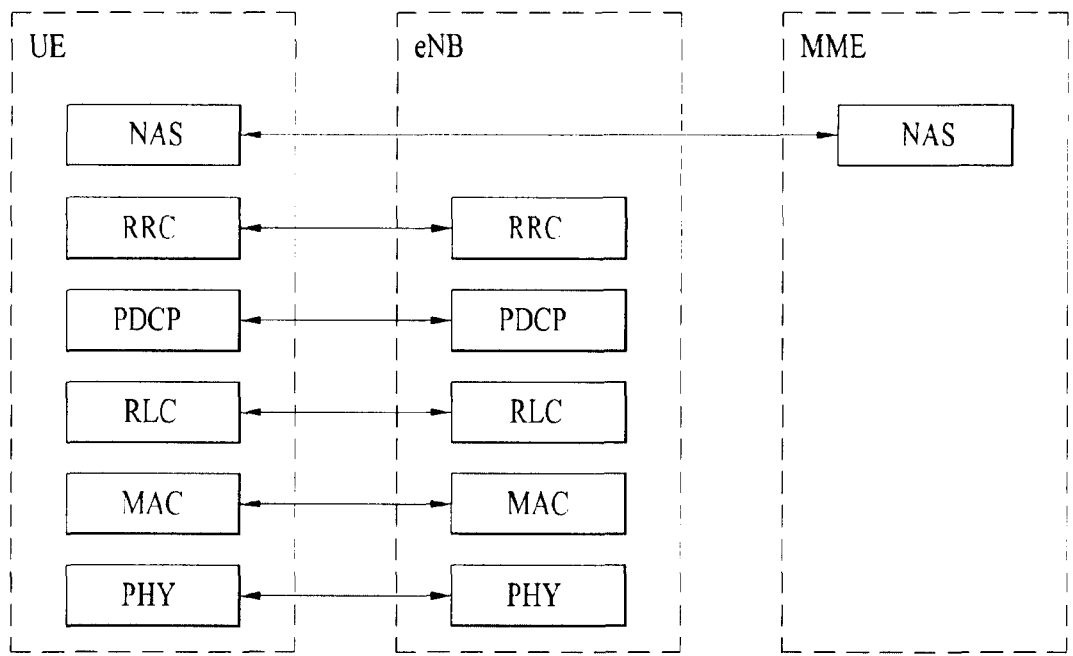
(a) control-plane protocol stack
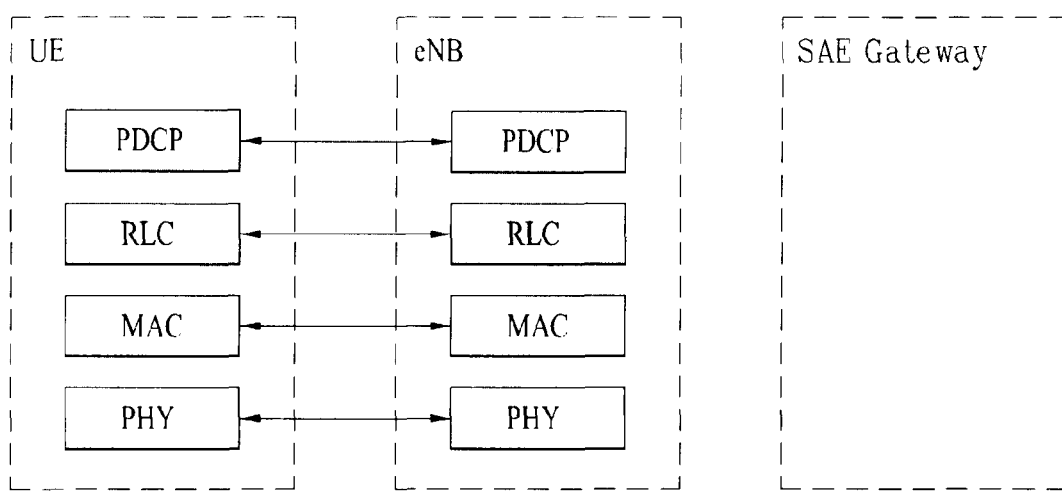
(b) user-plane protocol stack

FIG. 8
| CQI reporting mode | PMI feedback type | |
| --- | --- | --- |
| | no PMI | single PMI |
| PUCCH CQI feedback type — wideband (wideband CQI) | mode 1-0 | mode 1-1 |
| PUCCH CQI feedback type — UE-selected (subband CQI) | mode 2-0 | mode 2-1 |
FIG. 9
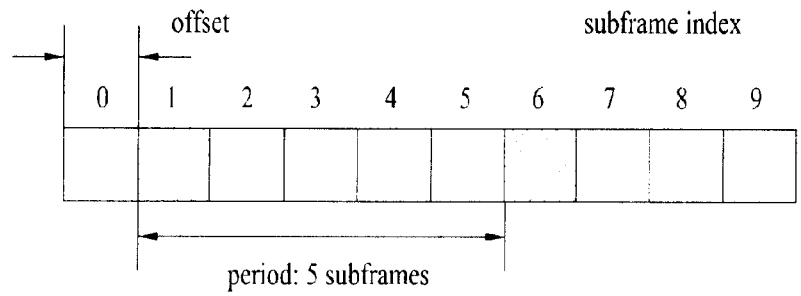
FIG. 10
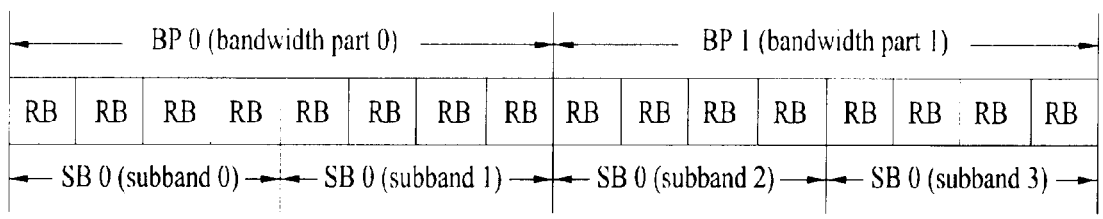

FIG. 12
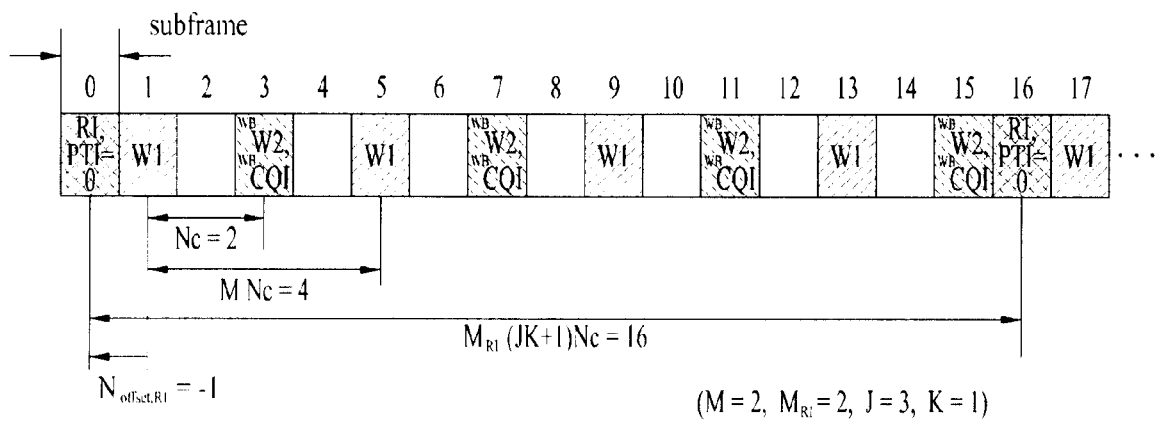
(M = 2, $M_{RI}$ = 2, J = 3, K = 1)
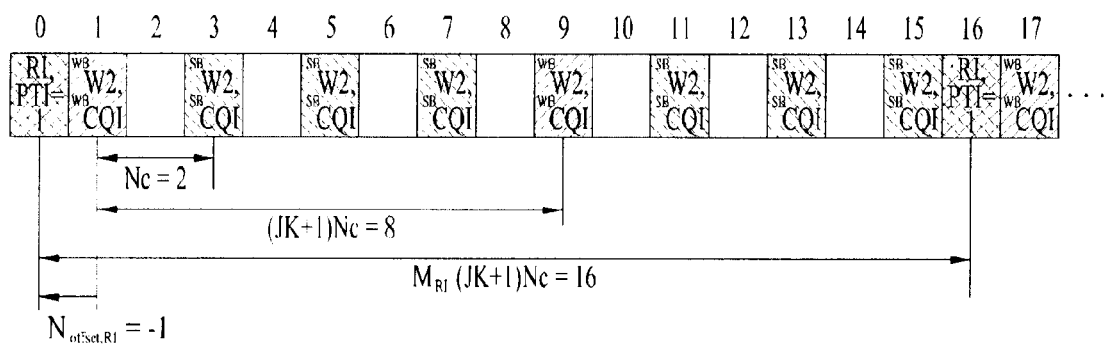
 Report 1    Report 2 w/ PTI=0    Report 3 w/ PTI=0
 Report 2 w/ PTI=1    Report 3 w/ PTI=1

METHOD FOR REPORTING CHANNEL STATE INFORMATION IN WIRELESS COMMUNICATION SYSTEM AND APPARATUS FOR SAME

The application is a national stage entry of International Application No. PCT/KR2011/009987, filed on Dec. 22, 2011, which claims benefit of U.S. Patent Application No. 61/427,101, filed on Dec. 23, 2010, which is hereby incorporated by reference in its entirety.

TECHNICAL FIELD

The present invention relates to a wireless communication system and, more particularly, to a method and device for reporting channel state information in a wireless communication system.

BACKGROUND ART

3GPP LTE ($3^{rd}$ Generation Partnership Project Long Term Evolution, referred to as 'LTE' hereinafter) will now be described as an exemplary wireless communication system to which the present invention is applicable.

FIG. 1 illustrates an E-UMTS (Evolved Universal Mobile Telecommunications System) as a wireless communication system. The E-UMTS is a system evolved from UMTS (Universal Mobile Telecommunications System) and currently standardized in 3GPP. The E-UMTS may be referred to as an LTE (Long Term Evolution) system. For details of the technical specifications of UMTS and E-UMTS, refer, respectively, to Release 7 and Release 8 of "$3^{rd}$ Generation Partnership Project; Technical specification Group Radio Access Network".

Referring to FIG. 1, the E-UMTS includes a user terminal (UE), an eNode B (eNB), and an access gateway (AG) located at the end of the network (E-UMTS) and connected to an external network. The eNB can simultaneously transmit multiple data streams for a broadcast service, multicast service and/or unicast service.

One or more cells are present per base station. A cell sets one of bandwidths of 1.25 MHz, 2.5 MHz, 5 MHz, 10 MHz, 15 MHz and 20 MHz for a carrier and provides downlink/uplink transmission service to a plurality of UEs. Different cells may provide different bandwidths. An eNB controls data transmission/reception to/from a plurality of UEs. The eNB transmits downlink scheduling information about downlink data to a UE to inform the UE of a time/frequency region in which the downlink data will be transmitted, coding information, data size, hybrid automatic repeat and request (HARQ) related information, etc. The eNB transmits uplink scheduling information about uplink data to the UE to inform the UE of a time/frequency region that can be used by the UE, coding information, data size, HARQ related information, etc. An interface for user traffic or control traffic transmission may be used between eNBs.

While wireless communication technology has been developed into LTE based on wideband code division multiple access (WCDMA), demands and expectations of users and providers continue to increase. Furthermore, technical evolution is needed for future competitiveness of wireless communication technology since other wireless access technologies are under development. For technical evolution, reduction of cost per bit, service availability increase, flexible use of frequency band, simplified structure, open interface, appropriate power consumption of terminals, etc. are required.

DISCLOSURE

Technical Problem

An object of the present invention devised to solve the problem lies in a method and device for reporting channel state information in a wireless communication system.

Technical Solution

The object of the present invention can be achieved by providing a method for reporting Channel State Information (CSI) at a User Equipment (UE) in a wireless communication system, the method including: measuring downlink signals from a plurality of base stations; feeding back first CSI for a first base station in units of a subband, wherein the first CSI includes identification information for indicating a corresponding subband; and feeding back second CSI for a second base station in units of a subband, wherein the subband corresponding to the second CSI is configured to be identical to the subband corresponding to the first CSI, and the second CSI excludes identification information for indicating a corresponding subband.

In another aspect of the present invention, provided herein is a UE configured to transmit CSI in a wireless communication system, the UE including a radio frequency (RF) module and a processor, wherein the processor is configured to measure downlink signals from a plurality of base stations, to feed back first CSI for a first base station in units of a subband, and to feed back second CSI for a second base station in units of a subband, wherein the first CSI includes identification information for indicating a corresponding subband, wherein the subband corresponding to the second CSI is configured to be identical to the subband corresponding to the first CSI, and the second CSI excludes identification information for indicating a corresponding subband.

The second CSI may include phase correction information for adjusting a phase between the downlink signal of the first base station and the downlink signal of the second base station.

The first CSI may be calculated assuming a non-CoMP mode, and wherein the second CSI is calculated assuming a CoMP mode.

The first CSI and the second CSI may be transmitted through a plurality of neighboring subframes in a subframe set configured for CSI feed-back.

The first base station may be a serving base station and the second base station may be a cooperative base station.

Advantageous Effects

According to the present invention, it is possible to report channel state information in a wireless communication system more effectively.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

FIG. 2 illustrates a control plane and a user plane of a radio interface protocol between a UE and E-UMTS based on the 3GPP wireless access network specification.

FIGS. 8 to 11 illustrate periodic channel state information reporting.

FIG. 12 illustrates periodic reporting of channel station information in an LTE-A system.

BEST MODE

Figure 1:
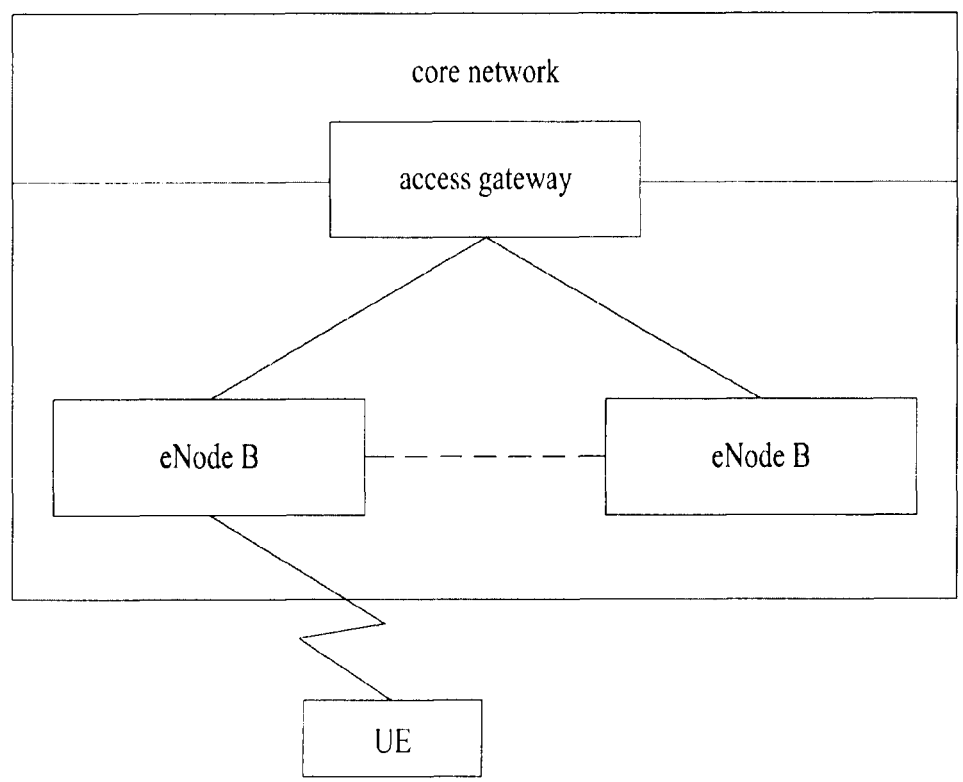
FIG. 1 illustrates E-UMTS as an exemplary wireless communication system.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In embodiments described below, technical features of the present invention are applied to 3GPP.

While the following description focuses on LTE and LTE-A, this is purely exemplary and thus should not be construed as limiting the present invention. Furthermore, while the following description is given based on FDD, embodiments of the present invention can be applied to H-FDD or TDD.

FIG. 2 illustrates a control plane and a user plane of a radio interface protocol between a UE and E-UMTS based on the 3GPP wireless access network specification. The control plane refers to a path through which control messages that a UE and a network use to manage a call are transmitted. The user plane refers to a path through which data generated in an application layer, for example, audio data or Internet packet data is transmitted.

A physical layer, a first layer, provides an information transfer service to a higher layer using a physical channel. The physical layer is linked to a medium access control (MAC) layer corresponding to a higher layer through a transport channel. Data is transmitted between the MAC layer and the physical layer through the transport channel. Data is transmitted between physical layers of a transmitter and a receiver through a physical channel. The physical channel uses time and frequency as radio resources. Specifically, the physical layer is modulated according to OFDMA (Orthogonal Frequency Division Multiple Access) on downlink and modulated according to SC-FDMA (Single Carrier Frequency division Multiple Access) on uplink.

The MAC layer, a second layer, provides a service to a radio link control (RLC) layer corresponding to a higher layer through a logical channel. The RLC layer supports reliable data transmission. Functions of the RLC layer may be implemented as functional blocks in the MAC layer. A PDCP (Packet Data Convergence Protocol) layer, a second layer, performs a header compression function of reducing unnecessary control information to efficiently transmit an IP packet such as IPv4 or IPv6 in a radio interface having a narrow bandwidth.

An RRC (Radio Resource Control) layer corresponding to the lowest of three layers is defined only in the control plane. The RRC layer controls logical channels, transport channels and physical channels with respect to configuration, reconfiguration and release of radio bearers (RBs). An RB refers to a service provided by the second layer for data transmission between a UE and a network. For data transmission between the UE and network, RRC layers of the UE and network exchange RRC messages. The UE is in an RRC connected mode when the RRC layers of the UE and network are RRC connected and is otherwise in an idle mode. A NAS (Non-Access Stratum) layer higher than the RRC layer performs session management and mobility management.

A cell constituting an eNB is set to one of bandwidths of 1.25 MHz, 2.5 MHz, 5 MHz, 10 MHz, 15 MHz and 20 MHz and provides a downlink or uplink transmission service to a plurality of UEs. Different cells may provide different bandwidths.

Downlink transport channels for transmitting data from a network to a UE include a broadcast channel (BCH) for transmitting system information, a paging channel (PCH) for transmitting a paging message, a downlink shared channel (SCH) for transmitting a user traffic or control message, etc. A traffic or control message of downlink multicast or broadcast service may be transmitted through the downlink SCH or a downlink multicast channel (MCH). Uplink transport channels for transmitting data from a UE to a network include a random access channel (RACH) for transmitting an initial control message and an uplink SCH for transmitting a user traffic or control message. Logical channels which are higher than transport channels and are mapped to the transport channels include a broadcast control channel (BCCH), a paging control channel (PCCH), a common control channel (CCCH), a multicast control channel (MCCH), a multicast traffic channel (MTCH), etc.

Figure 3:
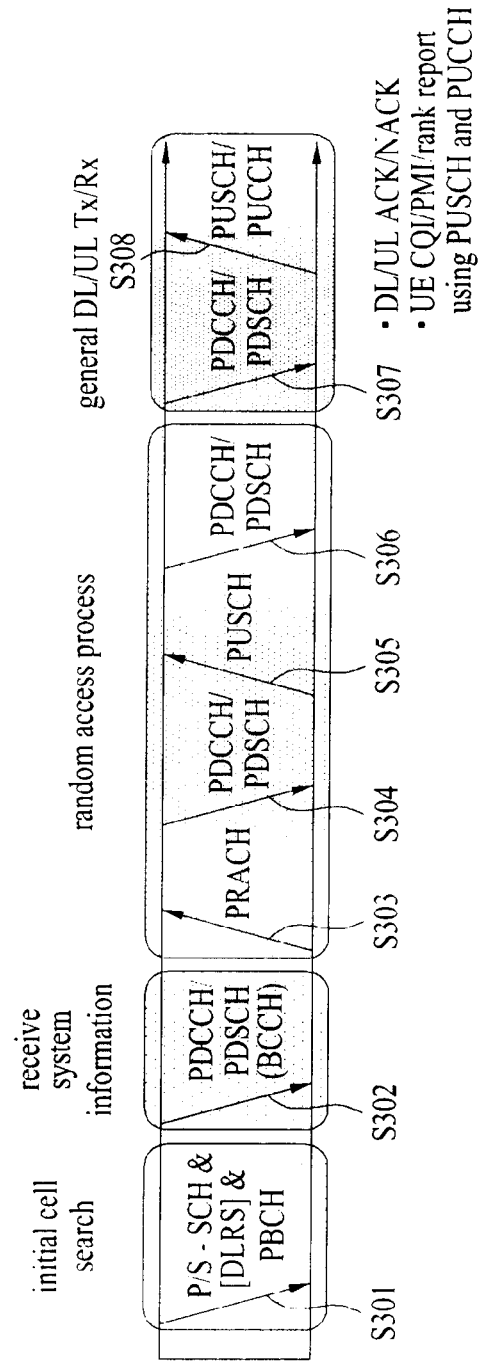
FIG. 3 illustrates physical channels used for a 3GPP system and a method of transmitting a signal using the physical channels.

FIG. 3 illustrates physical channels used for a 3GPP system and a method of transmitting a signal using the physical channels.

When powered on or when a UE initially enters a cell, the UE performs initial cell search involving synchronization with an eNB (S301). For initial cell search, the UE is synchronized with the eNB and acquires information such as a cell ID by receiving a primary synchronization channel (P-SCH) and a secondary synchronization channel (S-SCH) from the eNB. Then the UE may receive broadcast information from the eNB on a physical broadcast channel. The UE may determine a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH (S302).

When the UE initially accesses the eNB or there is no radio resource for signal transmission, the UE may perform a random access procedure (RACH) to access the eNB (S303 to S306). For random access, the UE may transmit a preamble to the eNB on a physical random access channel (PRACH) (S303 and S305) and receive a response message for preamble on a PDCCH and a PDSCH corresponding to the PDCCH (S304 and S306). In the case of contention-based random access, the UE may additionally perform a contention resolution procedure.

After the foregoing procedure, the UE may receive a PDCCH/PDSCH (S307) and transmit a physical uplink shared channel (PUSCH)/physical uplink control channel (PUCCH) (S308), as a general downlink/uplink signal transmission procedure. Particularly, the UE receives downlink control information (DCI) through a PDCCH. The DCI includes control information such as information about allocation or resources to the UE and a format thereof is designed according to application.

Control information transmitted from the UE to the eNB or control information transmitted from the eNB to the UE through uplink includes a downlink/uplink ACK/NACK signal, a channel quality indicator (CQI), a precoding matrix index (PMI), a rank indicator (RI), etc. In the case of 3GPP LTE, the UE can transmit the CQI/PMI/RI on a PUSCH and/or a PUCCH.

Figure 4:
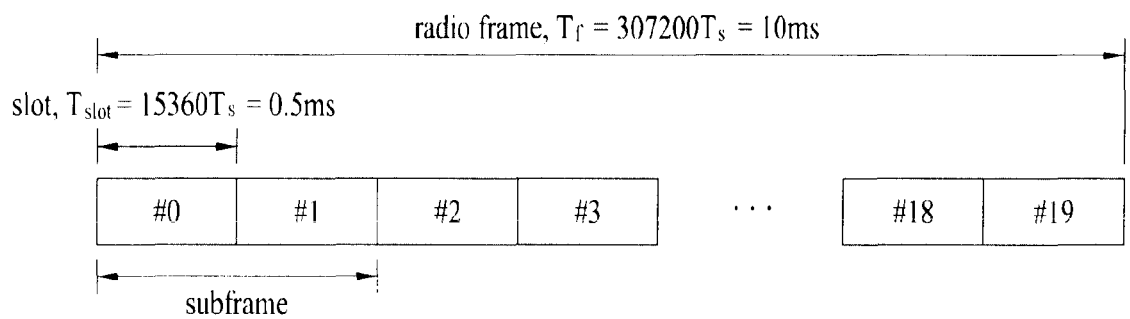
FIG. 4 illustrates a radio frame structure used in LTE.

FIG. 4 illustrates a radio frame structure used in LTE

Referring to FIG. 4, a radio frame has a length of 10 ms (307200×Ts) and includes 10 subframes of equal size. Each subframe has a length of 1 ms and includes two slots. Each slot has a length of 0.5 ms (15360×Ts). Here, Ts denotes sampling time and is represented as Ts=1/(15 kHz×2048) =3.1552×10$^{-8}$ (about 33 ns). Each slot includes a plurality of OFDM symbols in the time domain and a plurality of resource blocks in the frequency domain. In LTE, one resource block (RB) includes (12 subcarriers×7 (or 6) OFDM symbols). A unit time for transmitting data, a transmission time interval (TTI), may be defined based on one or more subframes. The above-described radio frame structure is exemplary and the number of subframes included in a radio frame, the number of slots included in a subframe, and the number of OFDM symbols included in a slot may be modified in various manners.

Figure 5:
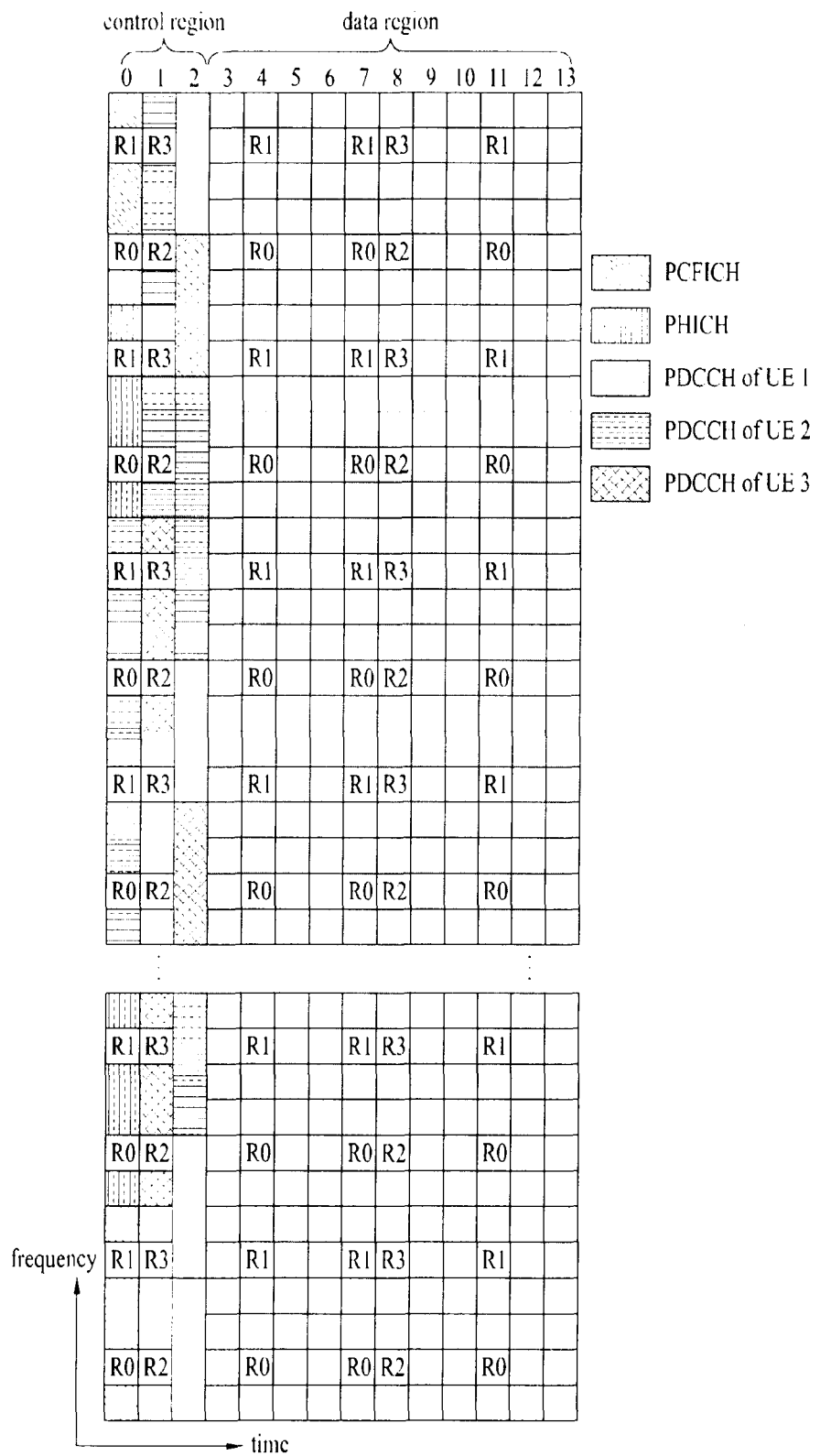
FIG. 5 illustrates a downlink radio frame structure used in LTE.

FIG. 5 illustrates control channels included in a control region of a subframe in a downlink radio frame.

Referring to FIG. 5, a subframe includes 14 OFDM symbols. One to three OFDM symbols located in a front portion of the subframe are used as a control region and the remaining eleven to thirteen OFDM symbols are used as a data region. In FIG. 5, R1 to R4 denote reference signals (RSs) or pilot signals with respect to antennas #0 to #3. RSs are fixed in a predetermined pattern within the subframe irrespective of the control region and the data region. Control channels are allocated to resources to which RSs are not assigned in the control region and traffic channels are allocated to resources to which RSs are not assigned in the data region. Control channels allocated to the control region include a physical control format indicator channel (PCFICH), a physical hybrid-ARQ indicator channel (PHICH), a physical downlink control channel (PDCCH), etc.

The PCFICH informs a UE of information regarding the number of OFDM symbols used for a PDCCH for each subframe. The PCFICH is transmitted at the first OFDM symbol and set prior to the PHICH and PDCCH. The PHICH is composed of 4 resource element groups (REGs) which are dispersed in the control region based on cell ID. One REG includes 4 resource elements (REs). An RE is a minimum physical resource defined by (a subcarrier×an OFDM symbol). PCFICH values indicate 1 to 3 or 2 to 4 and modulated according to quadrature phase shift keying (QPSK).

The PHICH is a HARQ indicator channel and is used to carry HARQ acknowledgment (ACK)/negative-acknowledgment (NACK) signal for uplink transmission. That is, DL ACK/NACK information for UL HARQ is transmitted on the PHICH. The PHICH is composed of one REG and is cell-specifically scrambled. ACK/NACK is a 1-bit signal and is modulated according to binary phase shift keying (BPSK). Modulated ACK/NACK is spread with a spreading factor (SF) of 2 or 4. A plurality of PHICHs mapped to the same resource form a PHICH group. The number of PHICHs multiplexed to the PHICH group is determined by the number of spreading codes. The PHICH (group) is repeated three times to obtain diversity gain in the frequency domain and/or time domain.

The PDCCH is allocated to n OFDM symbols located in the front portion of the subframe. Here, n is an integer greater than 1 and is indicated by the PCFICH. The PDCCH is composed of one or more CCEs. The PDCCH carries information regarding resource allocation of a PCH and DL-SCH, uplink scheduling grant, HARQ information, etc. to each UE or UE group. The PCH and DL-SCH are transmitted on a PDSCH. Accordingly, an eNB and a UE generally transmit and receive data through the PDSCH except for specific control information or specific service data.

Information about one or more UEs to which data of the PDSCH will be transmitted and information about how the UEs receive and decode the PDSCH data are included in a PDCCH and transmitted. For example, if a specific PDCCH is CRC-masked with a radio network temporary identity (RNTI) "A" and information about data transmitted using a radio resource (e.g. frequency position) "B" and a DCI format "C", that is, transport format information (e.g. transport block size, modulation scheme, coding information, etc.) is transmitted through a specific subframe, a UE in a cell monitors the PDCCH using RNTI information included therein. If one or more UEs include the RNTI "A", the UEs receive the PDCCH and receive a PDSCH indicated by "B" and "C" through information of the received PDCCH.

Figure 6:
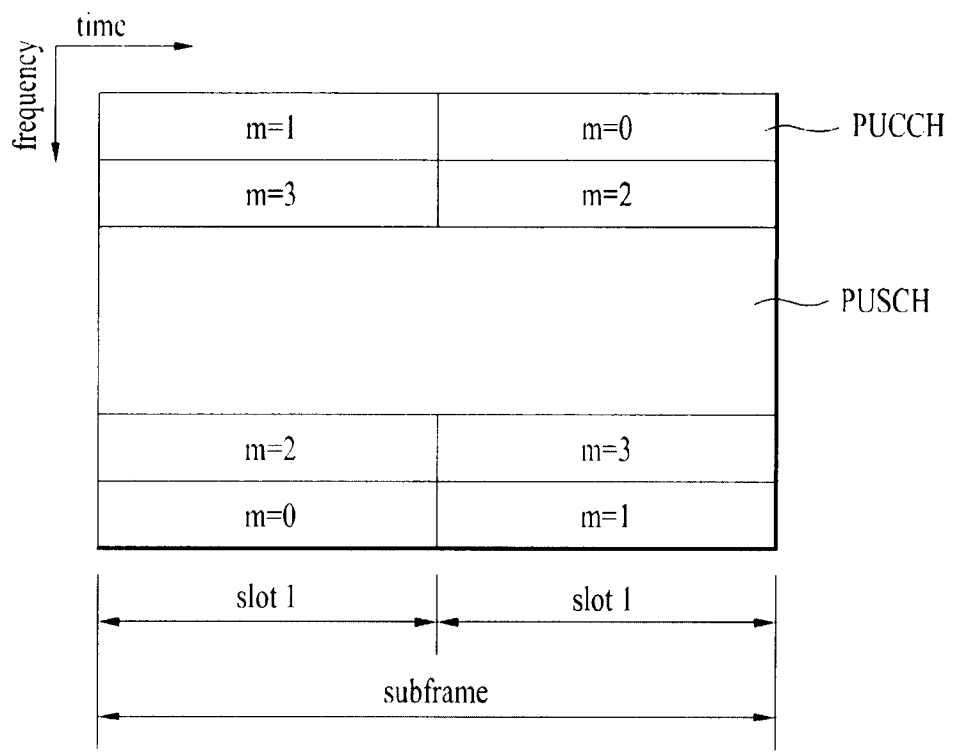
FIG. 6 illustrates an uplink radio frame structure used in LTE.

FIG. 6 illustrates an uplink subframe structure used in LTE.

Referring to FIG. 6, an uplink subframe can be divided into a region to which a physical uplink control channel (PUCCH) carrying control information is allocated and a region to which a physical uplink shared channel (PUSCH) carrying user data is allocated. The middle part of the subframe is allocated to the PUSCH and both sides of the data region in the frequency domain are allocated to the PUCCH. Control information transmitted on the PUCCH includes ACK/NACK used for HARQ, a CQI indicating a downlink channel state, an RI for MIMO, a scheduling request (SR) corresponding to an uplink resource allocation request, etc. A PUCCH for one UE uses a resource block occupying different frequencies in slots within the subframe. That is, 2 resource blocks allocated to the PUCCH are frequency hopped at the slot boundary. FIG. 6 illustrates allocation of a PUCCH with m=0, a PUCCH with m=1, a PUCCH with m=2 and a PUCCH with m=3 to the subframes.

A description will be given of a multiple-input multiple-output (MIMO) system. MIMO uses plural transmit antennas and plural receive antennas and can improve data transmission/reception efficiency. That is, the throughput and performance of a wireless communication system can be improved by using a plurality of antennas at a transmitter or a receiver of the wireless communication system. In the following, MIMO may be referred to as 'multi-antenna'.

MIMO does not depend on a single antenna path to receive a whole message. Rather, MIMO completes the message by combining data fragments received through a plurality of antennas. MIMO can increase data rate within a cell area having a specific size or extend system coverage at a given data rate. MIMO is broadly applicable to mobile terminals, relays, etc. It is possible to overcome the limit of throughput of conventional mobile communication sing a single antenna through MIMO.

Figure 7:
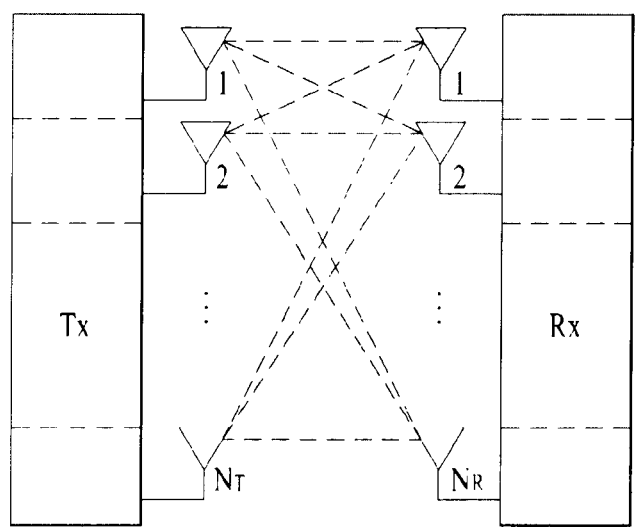
FIG. 7 illustrates a configuration of a MIMO communication system.
Figure 11:
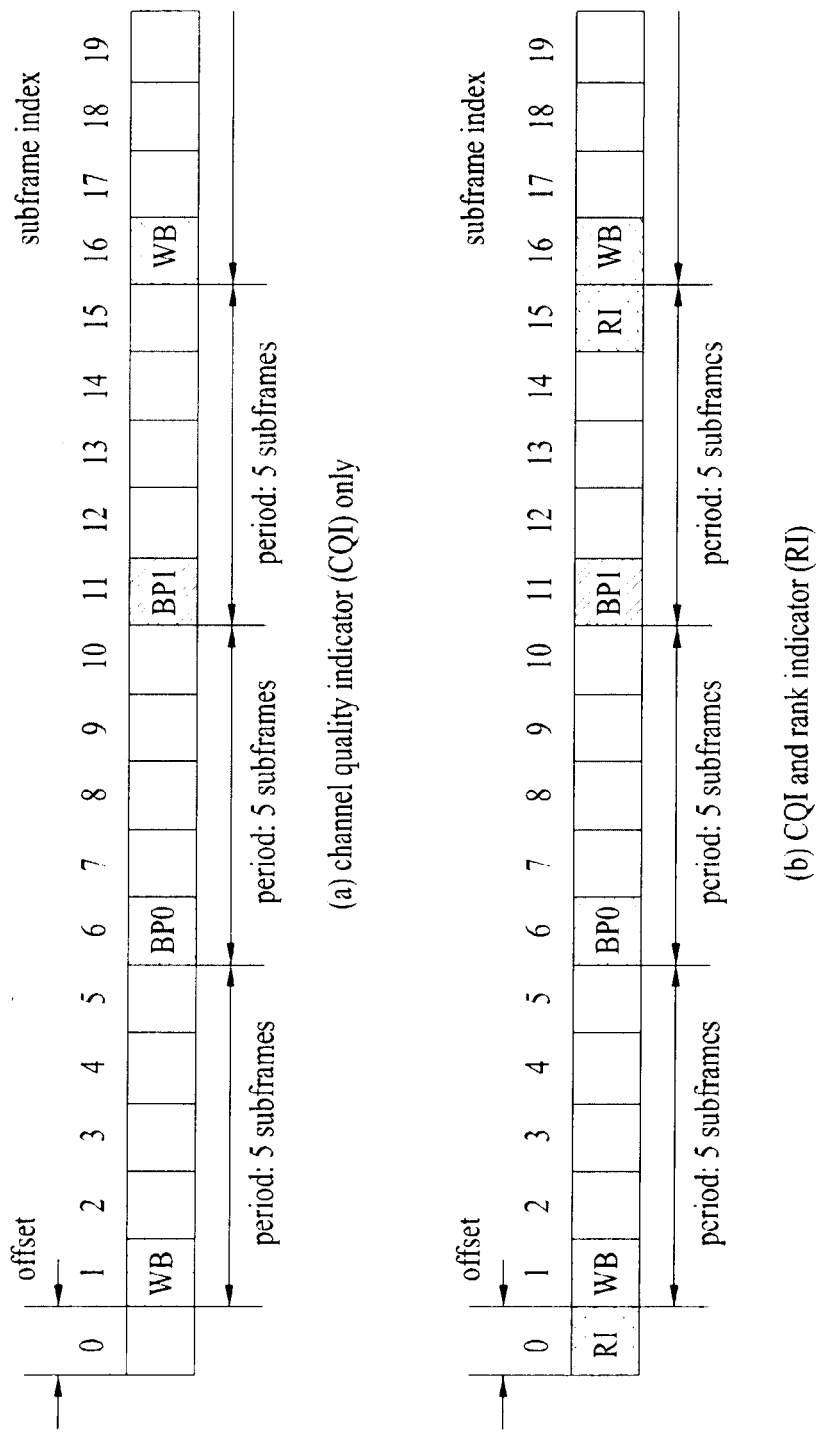

FIG. 7 illustrates a configuration of a typical MIMO communication system. When a transmitter uses $N_T$ transmit (Tx) antennas and a receiver uses $N_R$ receive (Rx) antennas, a theoretical channel transmission capacity is increased, compared to use of a plurality of antennas at only one of the transmitter and the receiver. Channel transmission capacity is increased in proportion to the number of antennas. Therefore, transmission rate and frequency efficiency can be increased. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas. Here, $R_i$ corresponds to the smaller of $N_T$ and $N_R$.

$$R_i = \min(N_T, N_R)$$ [Equation 1]

For instance, a MIMO communication system with 4 Tx antennas and 4 Rx antennas may theoretically achieve a fourfold increase in transmission rate, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. As illustrated in FIG. 7, it is assumed that $N_T$ Tx antennas and $N_R$ Rx antennas are present. Regarding a transmission signal, up to $N_T$ pieces of information can be transmitted through the $N_T$ Tx antennas, as expressed by the following vector.

$$s = [s_1, s_2, \ldots, s_{N_T}]^T$$ [Equation 2]

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [Ps_1, Ps_2, \ldots, Ps_{N_T}]^T$$ [Equation 3]

The transmission power-controlled transmission information vector $\hat{s}$ may be expressed as follows, using a diagonal matrix $P$ of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

$N_T$ transmitted signals $x_1, x_2, \ldots, x_{N_T}$ may be generated by multiplying the transmission power-controlled information vectors $\hat{s}$ by a weight matrix $W$. The weight matrix $W$ functions to appropriately distribute the transmission information to the Tx antennas according to transmission channel states, etc. These $N_T$ transmitted signals $x_1, x_2, \ldots, x_{N_T}$ are represented as a vector $X$, which may be determined by Equation 5. Herein, $w_{ij}$ denotes a weight between an $i^{th}$ Tx antenna and a $j^{th}$ piece of information. $W$ is called a weight matrix or a precoding matrix.

$$x = \begin{bmatrix} x_1 \\ x_2 \\ \vdots \\ x_i \\ \vdots \\ x_{N_T} \end{bmatrix}$$ [Equation 5]

$$= \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

In general, the rank of a channel matrix physically means a maximum number of given channels through which different pieces of information can be transmitted. Accordingly, the rank of the channel matrix is defined as the lesser of the numbers of independent rows and columns. Accordingly, the rank of the channel matrix is not larger than the number of rows or columns. For example, the rank of the channel matrix H, rank(H) is limited by Equation 6.

$$\text{rank}(H) \leq \min(N_T, N_R)$$ [Equation 6]

Let information transmitted using MIMO be defined as 'transmission stream' or simply 'stream'. 'Stream' can also be referred to as 'layer'. The number of transmission streams cannot be larger than the channel rank. Accordingly, the channel matrix H can be expressed by Equation 7.

$$\text{\# of streams} \leq \text{rank}(H) \leq \min(N_T, N_R)$$ [Equation 7]

Here, "# of streams" denotes the number of streams. It is noted that one stream can be transmitted through one or more antennas.

There may be various methods for matching one or more streams to a plurality of antennas. These methods can be described according to MIMO types as follows. Transmission of one stream through a plurality of antennas can be considered as a spatial diversity scheme and transmission of a plurality of streams through a plurality of antennas can be considered as a spatial multiplexing scheme. A hybrid of the spatial diversity and spatial multiplexing is possible.

A description will be given of channel state information (CSI) reporting. Open-loop MIMO operating without CSI and closed-loop MIMO operating based on CSI are present in LTE. Particularly, in closed-loop MIMO, each of an eNB and a UE can perform beamforming based on CSI to obtain MIMO antenna multiplexing gain. To obtain CSI from the UE, the eNB instructs the UE to feed back CSI with respect to a downlink signal by allocating a PUCCH or a PUSCH to the UE.

CSI is categorized into an RI, PMI and CQI. The RI indicates rank information of a channel, as described above, and represents the number of streams that can be received by a UE through the same time-frequency resource. The RI is determined by long term fading of the channel, and thus the RI is fed back to an eNB at a longer period than PMI and CQI.

The PMI is a value in which spatial characteristics of a channel are reflected and indicates a precoding matrix index of an eNB preferred by a UE based on a metric such as SINR. The CQI indicates channel intensity and represents a reception SINR that can be obtained by the eNB using the PMI.

As described above, CSI includes a CQI, PMI and RI although it is not limited thereto in LTE, and all or some of the CQI, PMI and RI are transmitted according to the transmission mode of each UE. Periodic transmission of CSI is referred to as periodic reporting and transmission of CSI at the request of an eNB is referred to as aperiodic reporting. In the case of aperiodic reporting, a request bit included in uplink scheduling information transmitted from the eNB is sent to a UE. Then, the UE transmits CSI considering a transmission mode thereof to the eNB through a PUSCH. In the case of periodic reporting, a period and an offset of the period are semi-statically signaled to each UE through a higher layer signal on a subframe basis. Each UE delivers CSI considering the transmission mode thereof to the eNB through a PUCCH in a predetermined period. If uplink data is present in a subframe in which CSI is transmitted, the CSI is transmitted with the uplink data through a PUSCH. The eNB transmits transmission timing information suitable for each UE to each UE in consideration of channel state of each UE, UE distribution in a cell, etc. The transmission timing information includes a period in which CSI is transmitted, an offset, etc. and may be transmitted to each UE through an RRC message.

FIGS. 8 to 11 illustrate periodic CSI reporting in LTE.

Referring to FIG. 8, 4 CQI reporting modes are present in LTE. Specifically, the CQI reporting modes are categorized into a wideband (WB) CQI mode and a subband (SB) CQI mode according to CQI feedback type and into a no PI mode and a single PMI mode according to whether a PMI is transmitted. Each UE receives information composed of a combination of a period and an offset through RRC signaling for periodic CQI reporting.

FIG. 9 illustrates an example of transmitting CSI when information representing {period '5', offset '1'} is signaled to a UE. Referring to FIG. 9, upon reception of the information representing a period of '5' and an offset of '1', the UE transmits CSI in 5 subframes with an offset corresponding to one subframe from subframe #0 in a direction in which the subframe index increases. While the CSI is basically transmitted through a PUCCH, when a PUSCH for transmitting data is present in the same time, the CSI is transmitted with the data through the PUSCH. The subframe index is composed of a system frame number $n_f$ and a slot index $n_s$ (0 to 19). Since a subframe includes two slots, the subframe index can be defined by $10*n_f+\text{floor}(n_s/2)$. Here, floor( ) denotes a floor function.

A scheme of transmitting a WB CQI only and a scheme of transmitting both the WB CQI and SB CQI are present. According to the scheme of transmitting the WB CQI only, CQI information about the overall band is transmitted in subframes corresponding to a CQI transmission period. When a PMI also needs to be transmitted according to PMI feedback type, as illustrated in FIG. 8, the PMI and CQI are transmitted together. According to the scheme of transmitting both the WB CQI and SB CQI, the WB CQI and SB CQI are alternately transmitted.

FIG. 10 illustrates a system having a system bandwidth corresponding to 16 RBs. In this case, it is assumed that the system bandwidth is composed of two bandwidth parts (BPs) BP0 and BP1 each of which includes two subbands (SBs) SB0 and SB1 each of which is composed of 4 RBs. However, the number of BPs and the sire of each SB may be varied according to system bandwidth. Furthermore, the number of SBs constituting each BP may depend on the number of RBs, the number of BPs and SB size.

In the case of the scheme of transmitting both the WB CQI and SB CQI, the WB CQI is transmitted in a first CQI transmission subframe and a CQI corresponding to the SB having a good channel state between SB0 and SB1 belonging to BP0 and the index of the corresponding SB are transmitted in the next CQI transmission subframe. Then, a CQI corresponding to the SB in good channel state between SB0 and SB1 belonging to BP1 and the index of the corresponding SB are transmitted in the next CQI transmission subframe. In this manner, the WB CQI is transmitted and then CQI information about respective BPs is sequentially transmitted. CQI information about BPs can be sequentially transmitted one to four times between two WB CQIs. For example, if CQI information about BPs is sequentially transmitted once between two WB CQIs, the CQI information can be transmitted in the order of WB CQI=>BP0 CQI=>BP1 CQI=>WB CQI. If CQI information about BPs is sequentially transmitted four times between two WB CQIs, the CQI information can be transmitted in the order of WB CQI=>BP0 CQI=>BP1 CQI=>BP0 CQI=>BP1 CQI=>BP0 CQI=>BP1 CQI=>BP0 CQI=>BP1 CQI=>WB CQI. Information about how many times each BP CQI is sequentially transmitted is signaled by a higher layer (e.g. RRC layer).

FIG. 11(a) illustrates an example of transmitting both the WB CQI and SB CQI when information representing {period '5', offset '1'} is signaled to a UE. Referring to FIG. 11(a), a CQI can be transmitted only in subframes corresponding to a signaled period and offset irrespective of CQI type. FIG. 11(b) illustrates a case in which an RI is additionally transmitted. The RI can be signaled by a higher layer (e.g. RRC layer) as a combination of information about a multiple of the WB CQI transmission period, which corresponds to an RI transmission period, and an offset in the RI transmission period. The offset of the RI is signaled as a value relative to the offset of the CQI. For example, if the offset of the CQI is '1' and the offset of the RI is '0', the RI has the same offset as that of the CQI. The offset of the RI is defined as 0 or a negative value. Specifically, FIG. 11(b) assumes a case in which the RI transmission period is equal to the WB CQI transmission period and the offset of the RI is '−1' in the same environment as FIG. 11(a). The RI transmission period is identical to the WB CQI transmission period since the RI transmission period is equal to the WB CQI transmission period. The offset of the RI is '−1', and thus the RI is transmitted on the basis of '−1' (i.e. subframe #0) with respect to the CQI offset '1'. When the RI offset is '0', the WB CQI transmission subframe and RI transmission subframe overlap. In this case, the WB CQI is dropped and the RI is transmitted.

In an evolved communication system such as LTE-A, additional multi-user diversity is obtained using MU-MIMO (multi-user MIMO). Since interference is present between UEs multiplexed in the antenna domain in MU-MIMO, accuracy of CSI may largely affect not only a UE that reports the CSI but also interference of other multiplexed UEs. Accordingly, MU-MIMO requires more accurate CSI reporting than SU-MIMO.

In LTE-A, a final PMI is divided into W1 corresponding to a long-term and/or wideband PMI and W2 corresponding to a short-term and/or subband PMI.

A long-term covariance matrix of a channel, represented by Equation 8, can be used as a hierarchical codebook transformation constituting a final PMI based on W1 and W2.

$$W=\text{norm}(W1\,W2) \qquad \text{[Equation 8]}$$

In Equation 8, W2 corresponds to a short-term PMI and is a codeword of a codebook configured to reflect short-term channel state information, W is a codeword (in other words, precoding matrix) of a final codebook, and norm(A) denotes a matrix in which the norm of each column of matrix A is normalized to 1.

W1 and W2 have structures as represented by Equation 9.

$$W1(i) = \begin{bmatrix} X_i & 0 \\ 0 & X_i \end{bmatrix}, \quad \text{[Equation 9]}$$

where $X_i$ is Nt/2 by M matrix.

$$W2(j) = \begin{bmatrix} \overbrace{e_M^k \quad e_M^l \quad \cdots \quad e_M^m}^{r \text{ columns}} \\ \alpha_l e_M^k \quad \beta_l e_M^l \quad \cdots \quad \gamma_l e_M^m \end{bmatrix} (\text{if rank} = r),$$

where $1 \leq k,l,m \leq M$ and k,l,m are integer. wherein Nt denotes the number of Tx antennas, M is the number of columns of a matrix $X_i$ and represents that the matrix $X_i$ includes M candidate column vectors, and $e_M^k$, $e_M^l$ and $e_M^m$ respectively indicate k-th, l-th and m-th column vectors in which only k-th, l-th and m-th elements from among M elements are 1 and the remaining elements are 0. In addition, $\alpha_i$, $\beta_i$ and $\gamma_i$ are complex values having unit norm and represent application of phase rotation to the k-th, l-th and m-th column vectors of the matrix $X_i$. Furthermore, i is an integer greater than 0 and denotes a PMI indicating W1 and j is an integer greater than 0 and denotes a PMI indicating W2.

In the codeword structure represented by Equation 9, cross polarized antennas are used. When antenna spacing is narrow, for example, when a distance between neighboring antennas is less than half a signal wavelength, correlation characteristics of a channel are reflected in the codeword structure. The cross polarized antennas can be categorized into a horizontal antenna group and a vertical antenna group which have uniform linear array (ULA) antenna characteristics and are co-located.

Therefore, correlation between antennas in each group has the same linear phase increment and correlation between antenna groups has phase rotation characteristics. Consequently, it is necessary to design the codebook by reflecting characteristics of a channel in the codebook because the codebook is composed of values obtained by quantizing the channel. For convenience of description, rank-1 codeword generated in the above-described structure is represented in Equation 10.

$$W1(i) * W2(j) = \begin{bmatrix} X_i(k) \\ \alpha_j X_i(k) \end{bmatrix} \quad \text{[Equation 10]}$$

In Equation 10, the codeword is represented by a vector of $N_T$ (the number of Tx antennas)×1 and is composed of an upper vector $X_i(k)$ and a lower vector $\alpha_j X_i(k)$ which respectively represent correlations between horizontal antenna groups and vertical antenna groups. $X_i(k)$ is preferably represented as a vector having linear phase increment in which correlation between antennas in each antenna group is reflected and can use a DFT matrix.

FIG. 12 illustrates periodic CSI reporting, which is being discussed in LTE-A. In the case of mode X-1, LTE-A sets a precoder type indication (PTI) parameter which is a 1-bit indicator and considers two types of subdivided periodic reporting modes according to PTI values, as illustrated in FIG. 12. In FIG. 12, W1 and W2 are codewords constituting a hierarchical codebook described with reference to Equations 8 and 9. Both W1 and W2 need to be determined in order to set a precoding matrix W accomplished by combining W1 and W2.

Referring to FIG. 12, in the case of periodic reporting, different reports corresponding to Report 1, Report 2 and Report 3 are transmitted in different repetition periods. Report 1 reports an RI and a 1-bit PTI value. Report 2 reports WB W1 (when PTI=0) or WB W2 and a WB CQI (when PTI=1). Report 3 reports WB W2 and WB CQI (when PTI=0) or SB W2 and SB CQI (when PTI=1).

Report 2 and Report 3 are transmitted in subframes (referred to as a first subframe set for convenience) having subframe indices that satisfy $(10*n_f+\text{floor}(n_s/2)-N_{offset,CQI})$ mod $(N_c)=0$. $N_{offset,CQI}$ corresponds to the offset value illustrated in FIG. 9 and $N_c$ denotes a subframe spacing between neighboring Reports 2 or Reports 3. FIG. 12 illustrates a case in which $N_{offset,CQI}=1$ and $N_c=2$. The first subframe set is composed of subframes having odd-numbered indices. Furthermore, $n_f$ denotes a system frame number (or radio frame index), $n_s$ denotes a slot index in a radio frame, floor( ) represents a floor function and 'A mod B' represents the remainder obtained by dividing A by B.

Report 2 is located in some subframes in the first subframe set and Report 3 is located in the remaining subframes. Specifically, Report 2 is located in subframes having subframe indices that satisfy $(10*n_f+\text{floor}(n_s/2)-N_{offset,CQI})$ mod $(H \cdot N_c)=0$. Accordingly, Report 2 is transmitted at an interval of $H \cdot N_c$ and one or more first subframes disposed between neighboring Reports 2 are used to transmit Report 3. When PTI=0, H=M and M is determined by higher layer signaling. FIG. 12 illustrates a case in which M=2. When PTI=1, H=J·K+1, K is determined by higher layer signaling and J denotes the number of BPs. FIG. 12 illustrates a case in which J=3 and K=1.

Report 1 is transmitted in subframes having subframe indices that satisfy $(10*n_f+\text{floor}(n_s/2)-N_{offset,CQI}-N_{offset,RI})$ mod $(M_{RI} \cdot (J \cdot K+1) \cdot N_c)=0$. $M_{RI}$ is determined by higher layer signaling. $N_{offset,RI}$ denotes a relative offset value for an RI. FIG. 12 illustrates a case in which $M_{RI}=2$ and $N_{offset,RI}=-1$. Report 1 transmission timing does not correspond to Report 2 transmission timing according to $N_{offset,RI}=-1$. When a UE calculates the RI, W1 and W2, the RI, W1 and W2 are related to one another. For example, W1 and W2 are calculated based on the RI and W2 is calculated based on W1. Upon reporting of Report 2 and Report 3 after Report 1, the corresponding eNB can be aware of a final W from W1 and W2.

LTE-A is expected to support coordinated multi-point (CoMP) transmission, which was not supported in any legacy standards, in order to improve data rate. CoMP transmission refers to a scheme through which two or more eNBs or cells cooperatively communicate with UEs to improve the performance of communication between a UE and an eNB (cell or sector) located in a shadow area.

CoMP transmission schemes may be categorized into joint processing (CoMP-JP) in the form of coordinated MIMO through data sharing and scheduling/beamforming (CoMP-CS/CB).

In the case of downlink, a UE can simultaneously receive data from plural eNBs that perform CoMP transmission and improve reception performance by combining signals received from the eNBs according to CoMP-JP (Joint transmission (JT)). A method by which one of eNBs that perform CoMP transmission transmits data to the UE at a specific time (dynamic point selection (DPS) may be considered. According to CoMP-CS/CB, the UE can instantaneously receive data from an eNB, that is, a serving eNB through beamforming.

When CoMP-JP is applied to uplink transmission, eNBs can simultaneously receive a PUSCH signal from a UE (Joint Reception (JR)). In the case of CoMP-CS/CB, only one eNB can receive a PUSCH. Employment of CoMP-CS/CB can be determined by coordinated cells (or eNBs).

Figure 13:
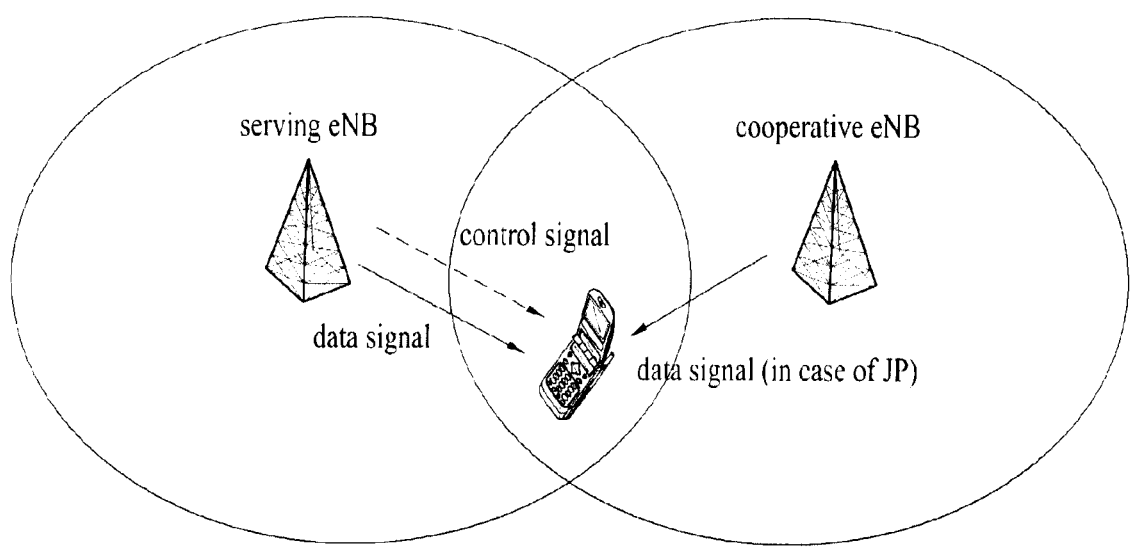
FIG. 13 illustrates a coordinated multi-point (CoMP) transmission system.

FIG. 13 illustrates an exemplary CoMP CB operation. In FIG. 13, a UE, i.e., a CoMP UE receives control information from a serving eNB (s-eNB) to operate and receives data only from the s-eNB. The CoMP UE can estimate radio channels from a c-eNB as well as the s-eNB and report CSI feedback for each eNB to the s-eNB. The s-eNB can transmit PMI recommendation information to the c-eNB on the basis of a reported PMI for the c-eNB. The c-eNB can perform beam avoidance and precoding for the same to minimize interference applied to the CoMP UE using the PMI recommendation information.

While FIG. 13 illustrates only one c-eNB, the present invention is applicable to a coordinating set including a plurality of c-eNBs. Furthermore, the present invention can be applied to not only inter-site CoMP in which an s-eNB and a c-eNB are located at a distance from each other, as illustrated in FIG. 13, but also intra-site CoMP in which eNBs in a coordinating set are geographically co-located or heterogeneous networks including a hybrid of inter-site CoMP and intra-site CoMP.

For CoMP transmission, higher CSI accuracy is required. For example, multiple eNBs cooperatively transmit the same data to a specific UE in the CoMP JT system, and thus the CoMP JT system can be regarded as a MIMO system in which antennas are geographically distributed. Accordingly, JT based MU-MIMO requires high CSI accuracy like single-cell MU-MIMO. In the case of CoMP CB, accurate CSI is needed in order to avoid interference of a neighboring cell, applied to a serving cell.

The present invention proposes a periodic CSI reporting method by which a UE periodically feeds back channel state information (CSI) on each base station (or cell) in a coordinating set for CoMP (e.g. CS/CB, JP, etc) operation. The periodic CSI feedback method proposed by the present invention is applicable to non-CoMP operation and dynamic cell selection (DCS) as well as CoMP operation, as necessary. Particularly, the present invention is applicable to a case in which channel information on each cell in a coordinating set is fed back as subband (SB) CSI as well as wideband (WB) CSI.

Embodiment 1

WB CSI Reporting for s-eNB and WB CSI Reporting for c-eNB(s)

A CoMP UE feeds back WB CSI for each of an s-eNB and a c-eNB. Since all feedback content for the s-eNB and c-eNB is WB CSI, the UE can transmit a report for the s-eNB (e.g. s-eNB WB PMI+WB CQI) first and then transmit a report for the c-eNBs (e.g., c-eNB WB PMI+WB CQI). If plural c-eNBs are present in a CoMP coordinating set, the reporting order of CSI for the c-eNBs can be sequentially defined. Otherwise, the reporting order of CSI for the c-eNBs can be defined in various manners according to a predetermined rule. For example, the UE can report WB CSI for the c-eNBs prior to WB CSI for the s-eNB. The frequency of reporting CSI for the s-eNB may be set to higher than the frequency of reporting CSI for a c-eNB. The reporting order of CSI for eNBs may be appropriately determined according to various conditions, for example, a feedback period, number of c-eNBs, etc. in combination with or separately from the above examples.

Prior to reporting of PMIs/CQIs for eNBs in the CoMP coordinating set, RIs can be fed back. If the same RI is configured for all eNBs in the CoMP coordinating set (e.g., an RI suitable for the channel of the s-eNB is commonly used for all eNBs in the CoMP coordinating set, an RI capable of representing RIs suitable for channels of eNBs in the coordinating set is used, etc.), the UE can transmit the common RI in a first reporting instance (e.g. subframe) and report PMIs/ CQIs calculated based on the RI in a cyclic manner until a period in which a new RI is reported. RIs may be independently reported for respective eNBs in the CoMP coordinating set. In this case, the RIs for the respective eNBs in the coordinating set can be reported in a predefined order prior to cyclic reporting of PMIs/CQIs for the eNBs in the CoMP coordinating set or the RIs can be reported in predefined instances prior to reporting of the first PMI/CQI based on a feedback chain for the eNBs.

When PMIs/CQIs for eNBs are reported, a relative phase corrector (RPC) may be added to feedback information on a c-eNB. That is, only PMI+CQI (which can be defined as a CQI in the case of non-CoMP) can be reported as feedback information for the s-eNB and PMI+CQI (which can be defined as a CQI in the case of CoMP)+RPC can be reported as feedback information for a c-eNB. When a PMI is determined per cell (or per eNB), the RPC can be used to adjust a relative phase between signals from eNBs in the CoMP coordinating set such that the sum of the signals from the eNBs becomes a constructive sum when the signals are summed at a UE. A feedback instance may have an insufficient bit width for adding RPC information (or an additional coding gain may be needed). In this case, a scheme for reducing the number of bits for PMI and/or CQI feedback can be considered. PMI sub-sampling may be employed to reduce the number of bits for PMI feedback. PMI sub-sampling is a method for decreasing the number of bits for PMI feedback by limiting a target of PMI feedback to some subsets of a PMI set. To reduce the number of bits for CQI feedback, when a CQI transmitted through a report for the s-eNB is a non-COMP CQI, for example, a CQI for a c-eNB may be transmitted in the form of a delta CQI with respect to the CQI for the s-eNB. Particularly, when RI>1, for the non-CoMP CQI with respect to the s-eNB, a CQI corresponding to codeword 0 and a CQI corresponding to codeword 1 can be separately calculated and consecutively transmitted. Otherwise, it is possible to reduce the number of bits for CQI feedback by commonly applying a delta CQI according to CoMP to two codewords without separately defining a CoMP CQI for a c-eNB for each codeword. Here, a non-CoMP CQI refers to a CQI on the assumption that CoMP is not applied, that is, CQI feedback is performed in the single-cell mode and a CoMP CQI refers to a CQI on the assumption that CQI feedback is performed in the CoMP mode.

In the case of PMI+CQI reporting for each eNB (PMI+CQI+RPC in the case of a c-eNB), a hierarchical codebook in which PMIs are categorized into long term and/or wideband PMI (W1) and short tem and/or subband PMI (W2) may be used. Reports of PMIs+CQIs (+RPCs) for eNBs may be transmitted through two or more reporting instances due to limited payload size per reporting instance according to characteristics of periodic reporting. In this case, CSI feedback for eNBs in the CoMP coordinating set may be reported by eNBs in a cyclic manner. For example, cyclic CSI reporting by eNBs can be performed in such a manner that full information (e.g. PMI+CQI (+RPC)) about each eNB is reported. In this case, plural consecutive reporting instances are grouped for each eNB. Specifically, CSI feedback can be performed in the order of W1 (c-eNB#1)=>W2#1 (c-eNB#1)=>W2#2 (c-eNB#1)=>W1 (c-eNB#2)=>W2#1 (c-eNB#2)=>W2#2 (c-eNB#2). Alternatively, cyclic CSI reporting by eNBs may be performed based on reporting instance. That is, CSI feedback can be performed in such a manner that feedback information regarding eNBs is reported in a cyclic manner in a reporting instance and feedback information regarding the eNBs is reported in a circulative manner in the next reporting instance. Specifically, CSI feedback can be performed in the order of W1 (c-eNB#1)=>W1 (c-eNB#2)=>W2#1 (c-eNB#1)=>W2#1 (c-eNB#2)=>W2#2 (e-eNB#1)=>W2#2 (c-eNB#2).

Figure 14:
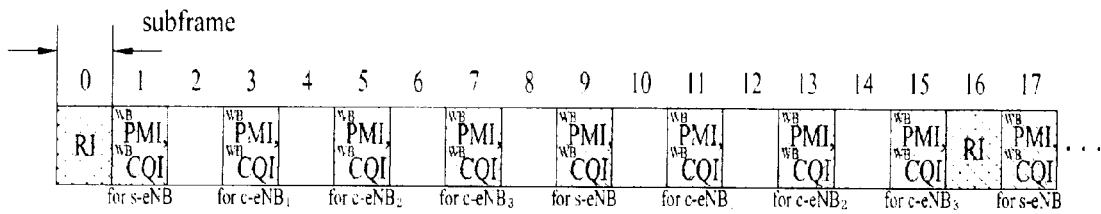
FIGS. 14 to 20 illustrate channel state information feedback/codebook configuration schemes according to embodiments of the present invention.
Figure 15:
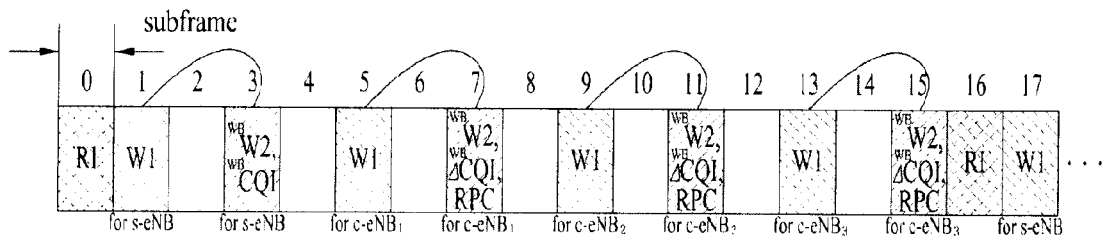

FIGS. 14 and 15 illustrate cases in which a CoMP UE reports wideband (WB) CSI for each of an s-eNB and a c-eNB according to the present embodiment. While FIGS. 14 and 15 assume that three c-eNBs (c-eNB$_1$, c-eNB$_2$ and c-eNB$_3$) are present, the number of c-eNBs is not limited thereto.

FIG. 14 illustrates a case in which a non-hierarchical codebook is used. Referring to FIG. 14, an RI is fed back in subframes corresponding to subframe index (SI)=0 and SI=16 and CSI (e.g. PMIs and/or CQIs) for the s-eNB/c-eNB is reported between the subframes corresponding to SI=0 and SI=16. Specifically, a WB PMI and a WB CQI for the s-eNB are reported in the subframes corresponding to SI=1 and SI=9. Here, the CQI for the s-eNB may be defined as a non-CoMP CQI. Upon reporting of the CSI for the s-eNB, CSI for the c-eNBs is sequentially reported. A CQI for a c-eNB can be defined as a CoMP CQI in which a gain obtained when the c-eNB and the s-eNB perform CoMP is reflected. Specifically, CSI (e.g. WB PMIs and WB CQIs) for c-eNB$_1$, c-eNB$_2$ and c-eNB$_3$, calculated based on the s-eNB CSI reported in the subframe corresponding to SI=1, is sequentially fed back in subframes corresponding to SI=3, SI=5 and SI=7. In addition, CSI (e.g. WB PMIs and WB CQIs) for c-eNB$_1$, c-eNB$_2$ and c-eNB$_3$, calculated based on the s-eNB CSI reported in the subframe corresponding to SI=9, is sequentially fed back in subframes corresponding to SI=11, SI=13 and SI=15. The CSI for c-eNB$_2$ may include an RPC. The RPC may be reported along with the PMI/CQI or reported in a separate reporting instance. When the RPC is reported along with the PMI/CQI, the bit width of the PMI/CQI can be reduced using PMI sub-sampling or a delta CQI to secure a bit width for the RPC.

FIG. 15 illustrates a case in which a hierarchical codebook is used. The case of FIG. 15 is distinguished from the case of FIG. 14 in that CSI feedback for each eNB in the CoMP coordinating set is transmitted through plural (e.g. two) reporting instances. For example, in the case of CSI reporting for the s-eNB, W1 is transmitted in the subframe corresponding to SI=1 and WB W2 and WB CQI are transmitted in the subframe corresponding to SI=3. Here, the CQI for the s-eNB can be defined as a non-CoMP CQI. Similarly, in the case of CSI reporting for c-eNB$_1$, W1 is transmitted in the subframe corresponding to SI=5 and WB W2 and WB delta CQI/RPC are transmitted in the subframe corresponding to SI=7. In the case of CSI reporting for c-eNB$_2$, W1 is transmitted in the subframe corresponding to SI=9 and WB W2 and WB delta CQI/RPC are transmitted in the subframe corresponding to SI=11. In the case of CSI reporting for c-eNB$_3$, W1 is transmitted in the subframe corresponding to SI=13 and WB W2 and WB delta CQI/RPC are transmitted in the subframe corresponding to SI=15. That is, during CSI reporting for each c-eNB, only W1 is transmitted in the first reporting instance in the same manner as in CSI reporting for the s-eNB and WB W2, WB delta CQI and RPC information simultaneously transmitted in the next reporting instance. The delta CQI represents a difference between the non-CoMP CQI for the s-eNB and a CQI for a c-eNB. In the case of rank of 2 or more, it is possible to reduce bit width of a CQI report for a c-eNB by feeding back a common delta CQI only on the assumption that non-CoMP CQIs are changed by the delta CQI through CoMP for all codewords. CQI and RPC information can be simultaneously transmitted in subframes corresponding to SI=7, SI=11 and SI=15 using a bit width obtained by reducing the bit width for CQI reporting during CSI reporting for a c-eNB. To secure the number of bits for RPC transmission, a method of reducing the number of bits necessary for PMI transmission using PMI sub-sampling may be considered.

Embodiment 2

Subband CSI Reporting for s-eNB and Wideband CSI Reporting for c-eNB(s)

For the s-eNB, periodic feedback of subband CSI as well as wideband SCI is being actively discussed in LTE-A. As described above, wideband CSI for the s-eNB is reported in such a manner that PMI+CQI are reported in one (in the case of a non-hierarchical codebook, for example) or M (M>1) (in the case of a hierarchical codebook, for example) reporting instances upon reporting of an RI. In the case of subband CSI reporting, however, PMI+CQI reported in one or M reporting instances need to be transmitted per specific (or selected) subband, remarkably increasing feedback throughput compared to wideband CSI reporting. For reference, in the legacy LTE system, several subbands are aggregated to configure a bandwidth (BP) part on the basis of a system bandwidth, several BPs configure the whole system bandwidth, a subband is selected from each BP and PMI+CQI corresponding to the selected subband are fed back. If a selected subband is not predefined, a best subband is selected from each BP and an L-bit subband selection indicator (SSI) indicating the selected subband is additionally fed back. Accordingly, PMI+CQI+SSI are transmitted in the case of subband CSI reporting.

A description will be given of a method for feeding back a subband CSI report for the s-eNB and feeding back wideband CSI for c-eNBs according to another embodiment of the present invention. According to this method, wideband CSI for c-eNBs is reported first and subband PMI+subband CQI+SSI for the s-eNB can be selected based on the reported wideband CSI for the c-eNBs such that CoMP performance is maximized. The subband CQI for the s-eNB is preferably defined as a CQI (i.e. CoMP CQI) expected when the s-eNB and the c-eNBs perform CoMP.

When two or more c-eNBs are present, wideband CSI for a c-eNB estimated to have the highest CoMP gain can be reported first and then as many subband PMIs+subband CQIs+SSIs as the number of subbands to be transmitted, for the s-eNB, which are appropriately matched with the wideband CSI for the c-eNB, can be reported. Subsequently, wideband CSI for a c-eNB estimated to have the second highest CoMP gain can be reported and then as many s-eNB subband PMIs+subband CQIs+SSIs as the number of subbands to be transmitted, which are appropriately matched with the wideband CSI for the c-eNB, can be reported. In this case, c-eNB indices arranged in descending order of CoMP gain need to be signaled. To achieve this, an RI reported prior to PMI+CQI may be reported along with c-eNB index information in a reporting instance of the RI or the c-eNB index information may be predefined through other methods. For example, the RI and c-eNB index information can be joint-coded. Alternatively, when the number of c-eNBs is two or more, wideband CSI for c-eNBs may be sequentially reported based on c-eNB (or cell) index instead of CoMP gain. In this case, the c-eNB index information need not be included in feedback information.

Furthermore, RPC information may be added to the subband report for the s-eNB. To achieve this, it is possible to reduce a bit width necessary for a subband PMI/CQI and to additionally transmit the RPC information through a bit width obtained by decreasing the bit width for the subband PMI/CQI by sub-sampling the subband PMI or defining the subband CQI as a delta CQI with respect to a wideband CQI for a c-eNB. Alternatively, it is possible to omit a subband selection information bit SSI and transmit the RPC information instead of the SSI. In this case, a subband can be selected in a predetermined pattern according to predefined cycling. A subband selection pattern may be previously provided through higher layer signaling.

When a hierarchical codebook is applied to the above-described schemes, a reporting instance for CSI feedback for an eNB may be M (>1) subframes. In this case, the above-described schemes can be extended in such a manner that report content in the M subframes is distributed according to a rule determined for a subframe based reporting instance and transmitted.

Figure 16:
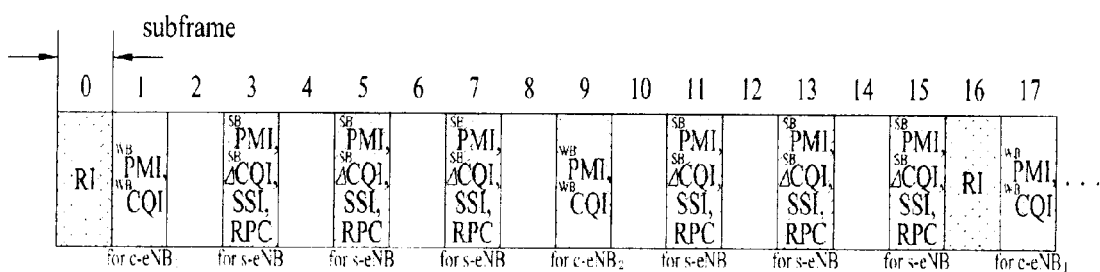
Figure 17:
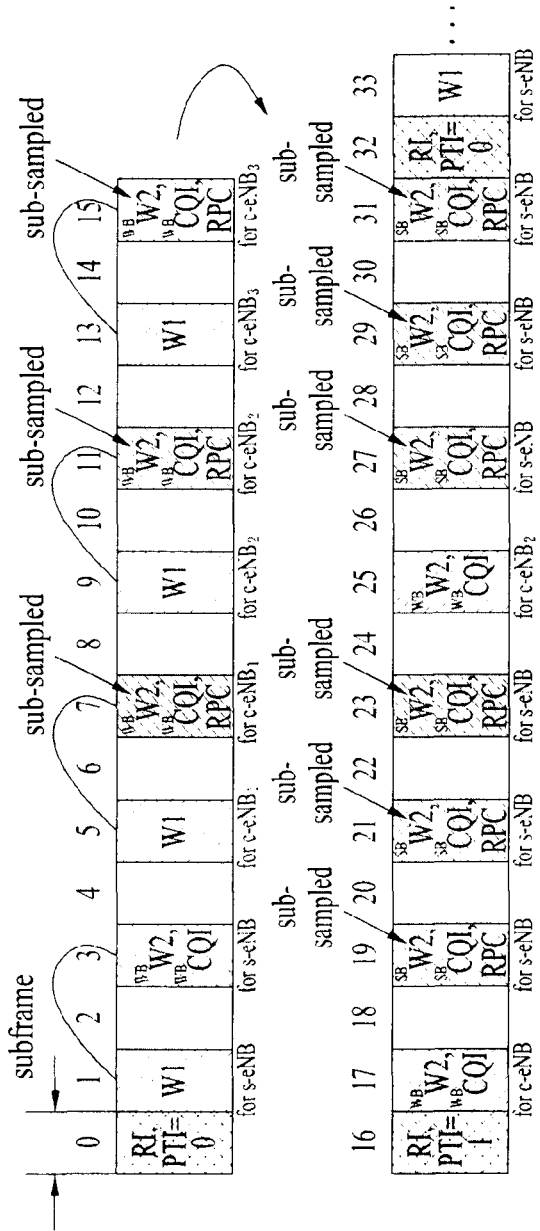

FIGS. 16 and 17 illustrate cases in which a CoMP UE reports SB CSI for the s-eNB and reports WB CSI for c-eNBs according to the present embodiment.

FIG. 16 illustrates a case in which a non-hierarchical codebook is used. While FIG. 16 assumes two c-eNBs (c-eNB$_1$ and c-eNB$_2$), the number of c-eNBs is not limited thereto. In this case, the CoMP UE reports WB CSI for each of c-eNB$_1$ and c-eNB$_2$ and reports SB SCI for the s-eNB.

Referring to FIG. 16, a WB PMI and a WB CQI for c-eNB$_1$ are transmitted in the subframe corresponding to SI=1. The CQI may be defined as a non-CoMP CQI when c-eNB$_1$ is selected according to dynamic cell selection. SB CSI for the s-eNB is reported in subframes corresponding to SI=3, SI=5 and SI=7. The SB CSI for the s-eNB includes at least one of a SB PMI, a SB delta CQI, an SSI and an RPC. The delta CQI may be defined as a CQI gain varied during CoMP with respect to a non-CoMP CQI reported prior thereto and may be commonly applied to two codewords. The SSI and RPC can be transmitted through a bit width secured using the delta CQI. When a subband is selected according to predefined cycling, the SSI can be omitted and thus a bit width for RPC information can be additionally secured. Upon feedback of CSI for c-eNB$_2$ in the subframe corresponding to SI=9, SB CSI for the s-eNB in consideration of CoMP performed by the s-eNB and c-eNB$_2$ is reported in subframes corresponding to SI=11, SI=13 and SI=15.

FIG. 17 illustrates a case in which a hierarchical codebook is used. While FIG. 17 assumes three c-eNBs (c-eNB$_1$, c-eNB$_2$ and c-eNB$_3$), the number of c-eNBs is not limited thereto. The case of FIG. 17 is distinguished from the case of FIG. 16 in that CSI feedback for each eNB in the CoMP coordinating set is transmitted through plural (e.g. two) reporting instances. FIG. 17 illustrates an example of transmission of report content before transmission of the next RI and PTI according to a predetermined rule when the 1-bit indicator PTI, which is discussed in LTE-A, and RI are simultaneously transmitted. Specifically, when PTI=0 (SI=0 to 15), W1 is transmitted as CSI for the s-eNB in the subframe corresponding to SI=1 and WB W2 and WB CQI are transmitted as CSI for the s-eNB in the subframe corresponding to SI=3. Here, the CQI can be defined as a non-CoMP CQI.

Subsequently, CSI for c-eNB$_1$ can be transmitted in subframes corresponding to SI=5 and SI=7, CSI for c-eNB$_2$ can be transmitted in subframes corresponding to SI=9 and SI=11 and CSI for c-eNB$_3$ can be transmitted in subframes corresponding to SI=13 and SI=15. Only W1 can be transmitted in the first reporting instance for CSI reporting of each c-eNB in the same manner as s-eNB CSI transmission and WB W2, WB delta CQI and RPC information can be simultaneously transmitted in the next reporting instance. In the present embodiment, WB W2 for c-eNBs can be additionally sub-sampled. Accordingly, additional bit width can be secured to transmit RPC information along with CSI. When a PTI of 1 is transmitted in the subframe corresponding to SI=16 and thus the following feedback content is changed to a form including SB CSI, CSI reporting can be performed in the order of FIG. 16. In this case, when SB CSI for the s-eNB is reported in the subframes corresponding to SI=19, SI=21, SI=23, SI=27, SI=29 and SI=31, W2 may be additionally sub-sampled in order to include RPC information. Subband selection may be defined according to predetermined cycling.

Embodiment 3

Wideband CSI Reporting for s-eNB and Subband CSI Reporting for c-eNB(s)

On the contrary to subband CSI for the s-eNB and wideband CSI reporting for c-eNBs described in embodiment 2, wideband CSI for the s-eNB and subband CSI for c-eNBs can be reported in embodiment 3. SB PMIs+SB CQIs (non-CoMP/CoMP CQIs, preferably, non-CoMP CQIs)+SSIs for the c-eNBs can be selected such that CoMP performance is maximized on the basis of previously reported s-eNB wideband CSI. A subband CQI for a c-eNB can be defined as a CQI (i.e. CoMP CQI) expected when the c-eNB performs CoMP with the s-eNB. RPC information may be added to subband reports for the c-eNBs in the same manner as the above embodiment. To achieve this, the subband PMIs can be sub-sampled or the subband CQIs can be defined as delta CQIs to reduce bit widths and RPC information can be added to the subband PMIs and subband CQIs. Alternatively, a subband selection information bit SSI can be omitted and a subband predetermined according to predefined cycling can be selected to transmit RPC information instead of the SSI. When a hierarchical codebook is applied to the above-described schemes, a reporting instance of CSI feedback for an eNB may correspond to M (>1) subframes. In this case, the above-described schemes may be extended in such a manner that report content through M subframes is distributed to subframe-based reporting instances according to a predetermined rule and transmitted.

Figure 18:
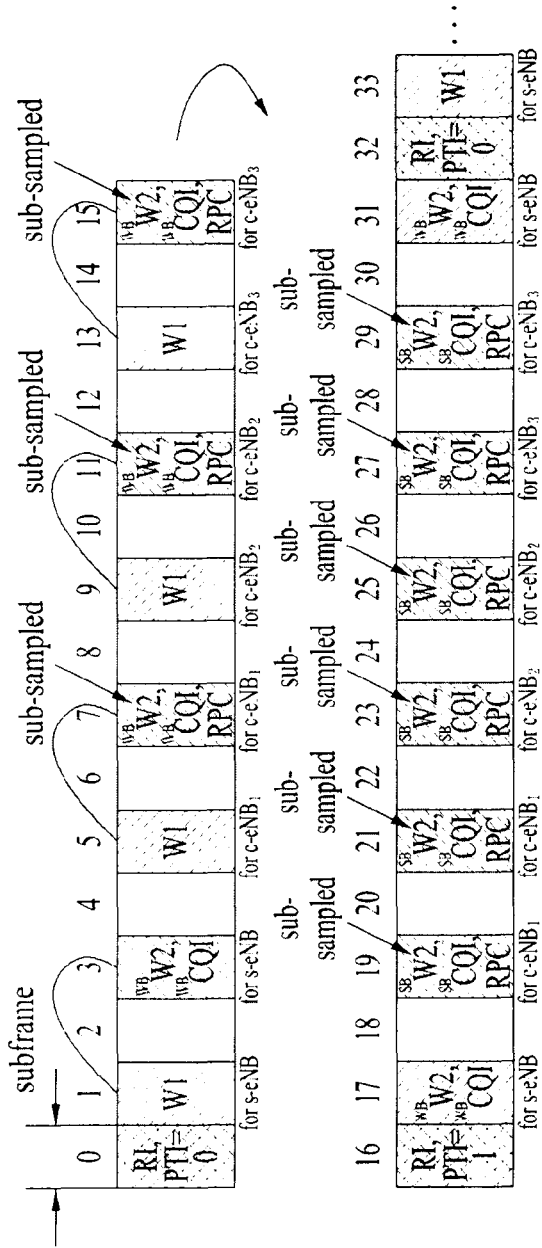

FIG. 18 illustrates a case in which s-eNB CSI is WB CSI and c-eNB CSI is SB CSI. As shown in FIG. 18, CSI reporting in the case of PTI=0 (SI=0 to 15) is performed in the same manner as in the case of FIG. 17. When a PTI of 1 is transmitted in the subframe corresponding to SI=16 and thus feedback content is modified into a form including SB CSI, WB W2 and WB CQI (which can be defined as a non-CoMP CQI) for the s-eNB are transmitted in the subframe corresponding to SI=17, SB CSI for c-eNB$_1$ is transmitted in the subframes corresponding to SI=19 and SI=21, SB CSI for c-eNB$_2$ is transmitted in the subframes corresponding to SI=23 and SI=25 and SB CSI for c-eNB$_3$ is transmitted in the subframes corresponding to SI=27 and SI=29.

Embodiment 4

Subband CSI Reporting for s-eNB and Subband CSI Reporting for c-eNBs

The present embodiment proposes a feedback scheme by which the s-eNB and c-eNBs can perform subband CSI based CoMP by applying a periodic subband CSI feedback mode, which is actively discussed in LTE-A, to CSI reporting for c-eNBs as well as CSI reporting for the s-eNB. The proposed feedback scheme can maximize frequency diversity and provide more accurate channel information in the frequency domain.

As many SB PMIs+SB CQIs (non-CoMP/CoMP CQIs, preferably, non-CoMP CQIs)+SSIs for the s-eNBs as the number of subbands to be transmitted can be reported and as many SB PMIs+SB CQIs (non-CoMP/CoMP CQIs)+RPCs for each c-eNB in a predefined specific order as the number of subbands to be transmitted can be reported. When plural c-eNBs are present, CSI feedback may be performed in a cyclic manner for the c-eNBs. In this scheme, feedback information about a c-eNB includes an RPC instead of an SSI. In this case, a subband selection order of a c-eNB may be identical to a subband selection order of the s-eNB according to SSI. Since CoMP transmission can be performed on the same subband, the subband selection order of the c-eNB can correspond to the subband selection order of the s-eNB.

Furthermore, CSI feedback may be transmitted in a cyclic manner for selected subband indices in such a manner that all s-eNB SB CSI and c-eNB SB CSI with respect to a subband index are reported for all eNBs in the coordinating set and then all s-eNB SB CSI and c-eNB SB CSI with respect to the next subband index are reported for all eNBs in the coordinating set. Here, it is important to include an RPC instead of an SSI in a SB CSI for a c-eNB and transmit the SB CSI including the RPC. The SB CSI for the c-eNB refers to CSI in a subband indicated by the SSI of SB CSI of the s-eNB, which is paired with the SB CSI of the c-eNB. Here, 'pair' means that an SB report of a c-eNB is predefined according to a predetermined rule such that the SB report of the c-eNB conforms to an SSI of an SB report of a specific s-eNB.

Figure 19:
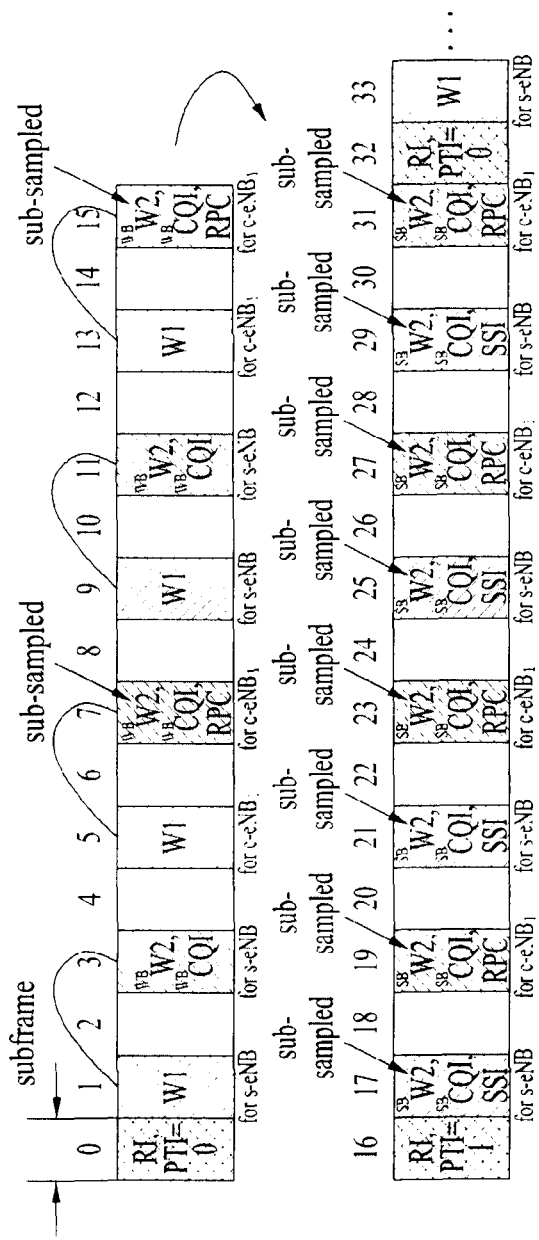

FIG. 19 illustrates a case in which all CSI reports for the s-eNB and c-eNBs correspond to SB CSI. While the case of FIG. 19 is based on the assumption that one c-eNB (c-eNB$_1$) is present, the number of c-eNBs is not limited thereto.

Referring to FIG. 19, while reporting through subframes corresponding to SI=0 to SI=15 in the case of PTI=0 is similar to the case of FIG. 17, a reporting pattern corresponding to SI=1, SI=3, SI=5 and SI=7 is repeated for SI=9, SI=11, SI=13 and SI=15 (only the reporting pattern is repeated and actually transmitted feedback content may be changed) since one c-eNB is present in the case of FIG. 19. When a PTI of 1 is transmitted in the subframe corresponding to SI=16 and thus feedback content is changed to a form including SB CSI, s-eNB SB CSI can be transmitted in a reporting instance and then SB CSI of c-eNB$_1$, which corresponds to the same SB index as that of the s-eNB SB CSI can be transmitted in the next reporting instance. Accordingly, reporting for an SB can be performed in subframes corresponding to SI=17 and SI=19, reporting for another SB can be performed in subframes corresponding to SI=21 and SI=23, reporting for another SB can be performed in subframes corresponding to SI=25 and SI=27 and reporting for another SB can be performed in subframes corresponding to SI=29 and SI=31. Each subband is selected based on the s-eNB and transmitted through an SSI in subframes corresponding to SI=17, SI=21, SI=25 and SI=29. The SSI need not be transmitted for c-eNBs because SB CSI corresponding to the same SB as that indicated by the SSI is transmitted for the c-eNBs. Accordingly, it is possible to transmit an RPC instead of the SSI in subframes corresponding to SI=19, SI=23, SI=27 and SI=31, as illustrated in FIG. 19.

Embodiment 5

Dynamic Selection of Report Content

The above-described [s-eNB WB CSI reporting and c-eNB WB CSI reporting], [s-eNB SB CSI reporting and c-eNB WB CSI reporting], [s-eNB WB CSI reporting and c-eNB SB CSI reporting] and [s-eNB SB CSI reporting and c-eNB SB CSI reporting] schemes proposed in the above embodiments differ from one another in terms of report content. That is, the above-described embodiments transmit a CSI report for the s-eNB and CSI reports for c-eNBs in a cyclic manner and report different report content. An appropriate scheme can be selected from among the above-described CSI feedback schemes according to the above embodiments according to frequency characteristics of a channel for each eNB in the coordinating set, estimated by the UE, (and/or antenna correlation information about each eNB). For example, WB CSI feedback is preferable when frequency selectivity is low or antenna correlation is high for each eNB and frequency diversity gain can be advantageously maximized through SB CSI feedback when frequency selectivity is high and antenna correlation is low and thus beam direction selectivity is sufficient.

The present embodiment proposes a scheme by which the UE dynamically selects a feedback scheme for different report content according to channel characteristics per eNB. To achieve this, a specific parameter (referred to as a feedback mode parameter for convenience) is set and the parameter and report content corresponding to a feedback scheme indicated by the parameter are fed back. The UE can determine the parameter according to a channel state thereof to dynamically select a feedback mode. For example, the 1-bit PTI parameter, currently discussed in LTE-A, can be used as the feedback mode parameter proposed by the present embodiment. In this case, the number of bits allocated to the PTI can be increased to enable dynamic selection of more CoMP feedback modes. When the PTI is used as the feedback mode parameter, an eNB may set the purpose (e.g. the purpose of the PTI in LTE-A or indication of a CoMP feedback mode) of the PTI through L1/L2 signaling (e.g. PDCCH signaling, MAC signaling, etc.) or higher layer signaling (e.g. RRC signaling) to distinguish the purpose of the PTI used as the feedback mode parameter from the purpose of the PTI in LTE-A. The feedback mode parameter may be reported along with an RI in an RI feedback reporting instance or reported in a separate instance. When the feedback mode parameter is fed back along with the RI, the feedback mode parameter and the RI can be joint-coded.

The following tables are mapping tables showing mapping relations between a 2-bit PTI and a 1-bit PTI and feedback schemes to be dynamically selected when the parameter for dynamic selection of a CoMP mode is referred to as a PTI in the same manner as in LTE-A.

TABLE 1

| 2-bit bitmap (PTI) | Feedback report content |
|---|---|
| 00 | s-eNB WB CSI report and c-eNB WB CSI report (Refer to embodiment 1) |
| 01 | s-eNB SB CSI report and c-eNB WB CSI report (Refer to embodiment 2) |
| 10 | s-eNB SB CSI report and c-eNB SB CSI report (Refer to embodiment 3) |
| 11 | Single cell (WB and SB reports) |

Table 1 shows an example of dynamic selection of report content when a 2-bit PTI is used. The number of bits of the PTI can be further increased. In this case, a feedback report such as an s-eNB WB CSI report and c-eNB SB CSI report (refer to embodiment 4) can be added to report content to be dynamically selected.

TABLE 2

| 1-bit bitmap (PTI) | Feedback report content |
|---|---|
| 0 | CoMP (WB report) |
| 1 | Single cell (SB report) |

Table 2 shows an example of utilization of a 1-bit PTI. The 1-bit PTI, which is being discussed in LTE-A, is designed such that WB CSI feedback is supported when PTI=0 and SB CSI feedback is supported when PTI=1 on the basis of a single cell. Table 2 shows a modification of the PTI for the purpose of CoMP operation. When the PTI is set to 0 in Table 2, a CoMP feedback mode used for CSI reporting can be pre-designated through L1/L2 signaling or higher layer signaling or fixed to a specific feedback mode.

Figure 20:
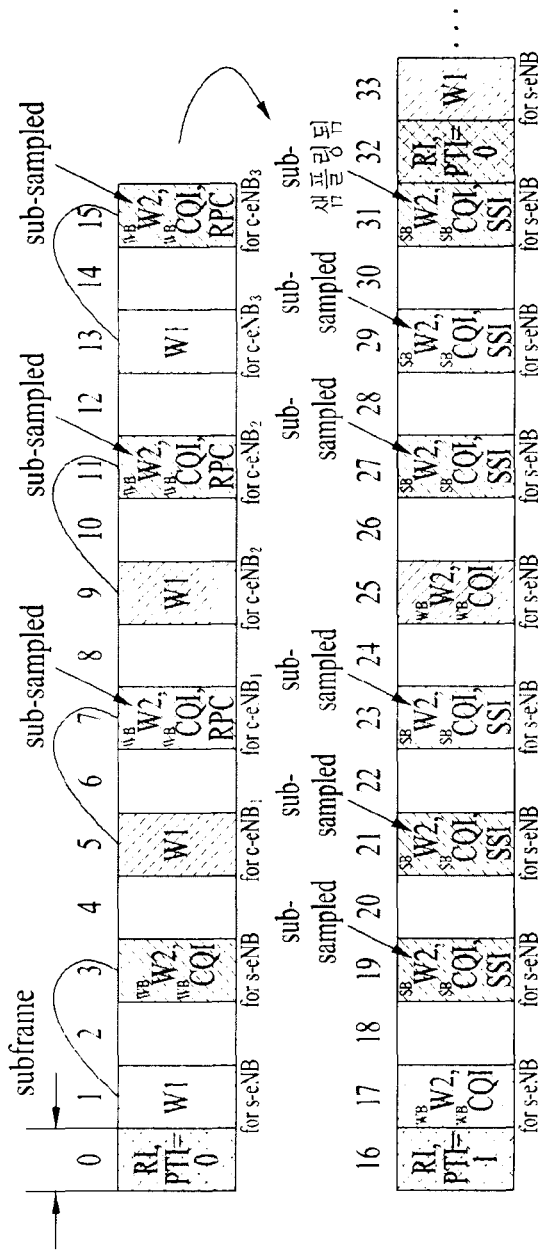

FIG. 20 illustrates a case in which report content is dynamically selected according to the scheme of Table 2.

Referring to FIG. 20, the UE may transmit a PTI of 0 upon determining that the CoMP reporting mode is preferable and feed back CSI in the CoMP reporting mode. Specifically, upon transmission of the PTI of 0 in the subframe corresponding to SI=0, the UE can perform CSI feedback in such a manner that the UE transmits WB CSI for the s-eNB in the subframes corresponding to SI=1 and SI=3, transmits WB CSI for c-eNB$_1$ in the subframes corresponding to SI=5 and SI=7, transmits WB CSI for c-eNB$_2$ in the subframes corresponding to SI=9 and SI=11 and transmits WB CSI for c-eNB$_3$ in the subframes corresponding to SI=13 and SI=15. When the number of c-eNBs is changed, reporting for respective eNBs can be performed in a cyclic manner according to the number of c-eNBs. Upon determination of single-cell reporting mode operation, the UE can transmits a PTI of 1 and then feed back CSI in the single-cell reporting mode (e.g. SB CSI). Specifically, upon transmission of the PTI of 1 in the subframe corresponding to SI=16, the UE operates in the single-cell reporting mode and can report SB CSI only for the s-eNB, as illustrated in FIG. 20. That is, the parameter such as the PTI can be used for dynamic selection between CoMP and non-CoMP in such a manner that "CoMP (wideband reporting)" is performed when PTI=0 and "single cell (subband reporting)" is performed when PTI=1, as shown in Table 2.

Figure 21:
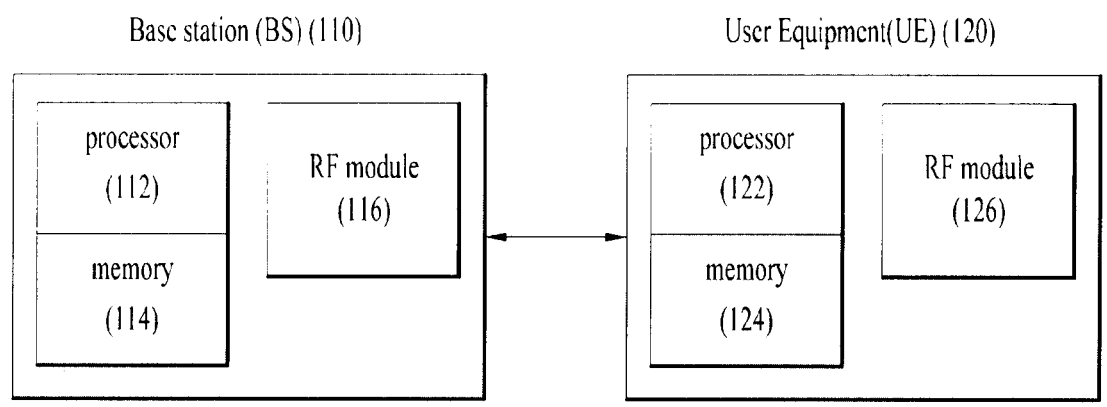
FIG. 21 illustrates a base station and a UE applicable to the present invention.

FIG. 21 illustrates a BS and a UE applicable to an embodiment of the present invention. In case of a wireless communication system including a relay, communication is performed between a BS and the relay in a backhaul link and between the relay and a UE in an access link. Accordingly, the BS or UE can be replaced by a relay as necessary.

Referring to FIG. 21, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While application of the method and device for reporting channel state information in a 3GPP LTE wireless communication system has been described, the method and device for reporting channel state information in a wireless communication system can be applied to various wireless communication systems other than 3GPP LTE.

The invention claimed is:

1. A method for reporting Channel State Information (CSI) at a User Equipment (UE) in a wireless communication system, the method comprising:
    measuring downlink signals of a plurality of base stations;
    feeding back first CSI for a first base station in a unit of subband, wherein the first CSI includes identification information for indicating a corresponding subband; and
    feeding back second CSI for a second base station in units of a subband, wherein the subband corresponding to the second CSI is configured to be identical to the subband corresponding to the first CSI, and the second CSI excludes identification information for indicating a corresponding subband,
    wherein the second CSI includes phase correction information for adjusting a phase between the downlink signal of the first base station and the downlink signal of the second base station.

2. The method according to claim 1, wherein the first CSI is calculated assuming a non-CoMP mode, and wherein the second CSI is calculated assuming a CoMP mode.

3. The method according to claim 1, wherein the first CSI and the second CSI are transmitted through a plurality of neighboring subframes in a subframe set configured for CSI feed-back.

4. The method according to claim 1, wherein the first base station is a serving base station and the second base station is a cooperative base station.

5. A User Equipment (UE) configured to transmit Channel State Information (CSI) in a wireless communication system, the UE comprising:
    a radio frequency (RF) module; and
    a processor configured to control the RF module,
    wherein the processor is configured to measure downlink signals of a plurality of base stations, to feedback first CSI for a first base station in a unit of subband, and to feedback second CSI for a second base station in a unit of subband,
    wherein the first CSI includes identification information for indicating a corresponding subband,
    wherein the subband corresponding to the second CSI is configured to be identical to the subband corresponding to the first CSI, and the second CSI excludes identification information for indicating a corresponding subband,
    wherein the second CSI includes phase correction information for adjusting a phase between the downlink signal of the first base station and the downlink signal of the second base station.

6. The UE according to claim 5, wherein the first CSI is calculated assuming a non-CoMP mode, and wherein the second CSI is calculated assuming a CoMP mode.

7. The UE according to claim 5, wherein the first CSI and the second CSI are transmitted through a plurality of neighboring subframes in a subframe set configured for CSI feedback.

8. The UE according to claim 5, wherein the first base station is a serving base station and the second base station is a cooperative base station.

* * * * *